United States Patent [19]
Willis et al.

[11] Patent Number: 5,814,230
[45] Date of Patent: Sep. 29, 1998

[54] APPARATUS AND METHOD FOR SEPARATION OF SOLIDS FROM LIQUID

[76] Inventors: H. Craig Willis, 2447 Uxbridge Drive N.W., Calgary, Alberta, Canada, T2N 3Z8; Bradley C. Willis, #1, 536-19th Avenue S.W.; W. Brent Willis, 441-13th Street N.W., both of Calgary, Alberta, Canada, T2S 0E2

[21] Appl. No.: 697,792

[22] Filed: Aug. 30, 1996

[51] Int. Cl.$^6$ .................................................. B01D 21/01
[52] U.S. Cl. ........................... 210/710; 166/267; 175/66; 175/206; 209/5; 209/17; 209/272; 209/307; 210/712; 210/734; 210/748; 210/770; 210/783; 210/785; 210/787; 210/803; 210/804; 210/195.1; 210/202; 210/297; 210/327; 210/384; 210/393; 210/526
[58] Field of Search ...................... 175/66, 206; 166/267; 209/5, 17, 18, 44, 272, 301, 308; 210/703, 710, 712, 725, 727, 728, 732, 768, 770, 783, 791, 803, 804, 158, 160, 181, 182, 195.1, 202, 297, 324, 327, 332, 333.01, 384, 391, 393, 400, 408, 526, 734, 748, 785, 787

[56] References Cited

U.S. PATENT DOCUMENTS

| | | | |
|---|---|---|---|
| 1,912,019 | 5/1933 | Steindorf | 210/526 |
| 2,941,668 | 6/1960 | Maus | 210/526 |
| 4,146,483 | 3/1979 | Lee | 210/384 |
| 4,230,477 | 10/1980 | Sharonov et al. | 210/526 |
| 4,243,527 | 1/1981 | Leonard | 210/785 |
| 4,302,331 | 11/1981 | Condit | 210/160 |
| 4,599,117 | 7/1986 | Luxemburg | 210/708 |
| 4,911,384 | 3/1990 | Murphy | 210/167 |
| 5,336,417 | 8/1994 | Hannum | 210/803 |
| 5,570,749 | 11/1996 | Reed | 175/66 |

FOREIGN PATENT DOCUMENTS

| | | |
|---|---|---|
| 0278952 | 8/1988 | Sweden . |
| WO9312321 | 6/1993 | United Kingdom . |

OTHER PUBLICATIONS

Patent Abstracts of Japan, vol. 015, No. 252(C–0844), 26 Jun. 1991 & JP 03 080950 A (Nakaya Jitsugyo KK), 5 Apr. 1991.

*Primary Examiner*—Peter A. Hruskoci

[57] ABSTRACT

Method and apparatus are provided for separating coarse and ultrafine solids from a liquid stream to produce a substantially dry solids discharge and a clarified liquid. Apparatus is provided comprising a combination of a settling tank, a plurality of filter screens spaced along an endless link-chain conveyor, a screen vibrator and directed air streams. In operation, coarse solids settle preferentially to the tank bottom. Ultrafines solids remain in suspension. Relatively coarse filter screens are conveyed from a point outside the tank to traverse a prolonged path through the liquid. Ultrafine solids are captured on the screens, by filtering the liquid through an ever finer build-up of filter cake. The relatively large number of passes of the screens through the liquid provides effective filtering of suspended solids. Further, the screens dredge settled solids from the tank bottom. After exiting the liquid, collected coarse and ultrafine solids are dewatered by vibration of the screens and directed blasts of air. Dewatered solids are dumped external to the tank and clarified water is recovered from the tank. Enhanced polymer flocculation may be practised to form flocs from ultrafine solids, after which flocs may be collected (filtered/dredged), dewatered and dumped using the invention. Dewatered solids can further be subjected to compression and decompression cycles to separate even more water from the solids.

33 Claims, 12 Drawing Sheets

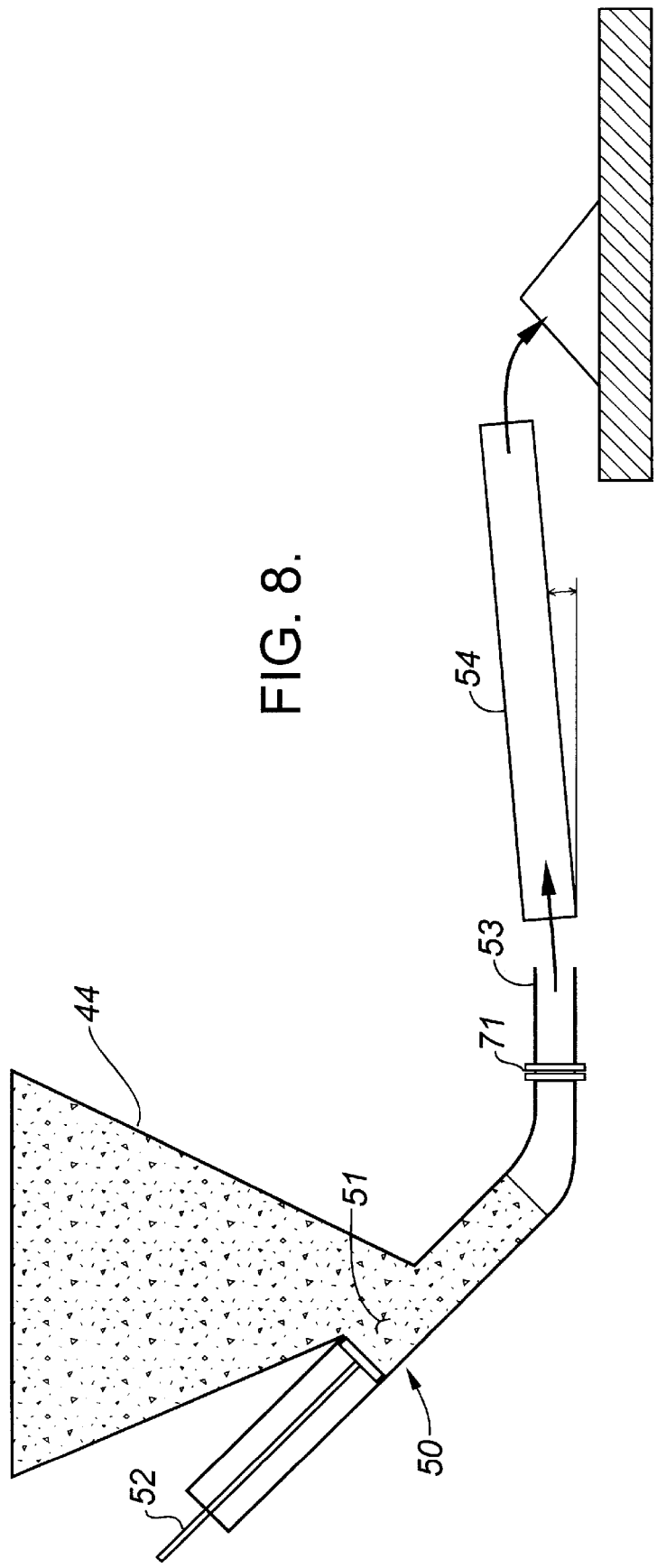

APPARATUS AND METHOD FOR SEPARATION OF SOLIDS FROM LIQUID

FIELD OF THE INVENTION

This invention relates to apparatus and method for separating solids from liquids. More particularly, solids are separated from a liquid flow using an endless conveyor carrying screen filters which dredge gravity-settled solids from the bottom of a settling tank and filter solids suspended in the liquid. The solids are dewatered while on the filters using a combination of vibration and air streams.

BACKGROUND OF THE INVENTION

While the separation of fine solids and liquids may be applicable to many processes, the apparatus and the method of the present invention is described herein with respect to the separation of solids from oil well drilling muds.

In rotary drilling of oil and gas wells, a specialized mixture, or "mud", is continuously circulated down through a drill string and back up to the surface to a tank assembly. The mud comprises a liquid carrier (typically water or diesel oil) which is mixed with additives. In the case of a water-based mud, this may include bentonite clay and various chemicals. The mud carries out several functions for assisting in the drilling process, including carrying away cuttings and fine solids produced by the drill bit as it bores through the rock. Entrained solids raise the mud's density and viscosity, leading to many drilling problems, including a reduced rate of penetration, loss of mud downhole and filter cake buildup. Therefore, for economic and environmental reasons, mud is typically treated to remove cuttings and ultrafines and the clarified product is recycled back to the active drilling mud system.

Additionally, for water based muds, a shortage of make-up water may make it imperative that the greatest portion of the mud be cleaned of fine drilled solids, for conservation of the liquid carrier.

For barite weighted muds, it is important to recycle the expensive barite and reject the low density drilled solids. Mud cleaners are typically employed which screen off coarse solids and reclaim fine barite. Unfortunately, this screening process is unable to differentiate between desirable fine barite solids and undesirable drilled solid ultrafines.

In conventional drilling practised in western Canada, a variety of processes and apparatus for separation of solids from used drilling muds are applied, generally in combination. As shown in Table 1, separation processes include the use of shale shakers, desanding and desilting hydroclones, settling tanks, large volume sumps, flocculation and centrifuges.

TABLE 1

| The frequency a combination is used | shakers | desilt & desand | sump | centr. 1 | centr. 2 | centr. 3 |
|---|---|---|---|---|---|---|
| up to 50% REMAINING 50% | X | X | X | | | |
| increasing popularity | X | X | | X | | |
| more common for deep holes | X | | | X | X | |

TABLE 1-continued

| The frequency a combination is used | shakers | desilt & desand | sump | centr. 1 | centr. 2 | centr. 3 |
|---|---|---|---|---|---|---|
| increasing use for deep holes | X | | | X | X + floc. | |
| uncommon, only for very deep wells | X | | | X | X | X + floc. |

The use of the above techniques can vary depending on the stage of the drilling operation. For example, drilling from the surface for placing surface casing usually requires a drilling mud; ultrafine production is limited, and the mud is generally readily cleaned of solids. Next, during water drilling, mud is not used, and high drilling rates are achieved. Returning water is clarified and recycled to the active system. Once the water is inadequate to lift the solids, or if downhole conditions warrant, mud is again used, this time producing significant quantities of ultrafines. Finally, when the drilling is complete, the liquids of the active mud system are left contaminated with accumulated fine solids which pose a disposal problem. The volume of the liquid is the most problematical and accordingly it is conventional to strip the mud of solids to obtain easily disposable clear water and substantially dry solids.

More particularly, as shown in FIG. 1, in all implementations of a conventional oil well drilling operation, a shale shaker is used. Mud returning out of the well is passed over a "shale shaker". Cuttings are recovered from the top of a screen. The shaker screen is vibrated to avoid "blinding" or plugging. Underflow is captured in a sand trap. Coarse fines settle and are periodically dumped to a pit or sump. Overflow from the sand trap is typically treated through hydroclones, or multiple stages of settling. The overflow from the final stage of settling is recycled back down the drill string to the drill bit.

Hydroclone use is usually associated with a large sump. Shaker sand trap overflow is desanded (using hydroclones greater than about 4"diameter) and desilted (hydroclones less than 4"diameter). Clarified hydroclone overflow is recycled back to the active system. Excellent performance in the active system is possible, achieving low mud densities of about 8.8–8.9 pounds/U.S. gal. Unfortunately, the wet hydroclone underflow contains not only by large quantities of solids (including ultrafine solids of 15 micron and less), but also a significant quantity of mud. This hydroclone underflow is rejected to one end of a sump. Make-up water, bentonite and fresh chemicals must be added to the system to compensate for that lost to the sump.

In a sump, solids in the hydroclone underflow, introduced at one end of the sump, separate under the force of gravity in the relatively quiescent conditions. Clarified, lower density drilling mud or clear water is recovered from the other end of the sump. As the solids content becomes finer, greater sump volumes are required to ensure the recycled liquid is sufficiently clarified. As a result, the sump grows in volume. Less clarified mud and its associated carrier liquid (typically water) is recycled back to the active system, requiring the addition of clear make-up liquids. This eventually leads to a need to practise expensive reclamation of a large volume of liquified waste. Accordingly, this technique is falling out of favour.

In response, the drilling industry has been progressing toward increased use of centrifuges. Accordingly, as shown in FIG. 2, a shale shaker may be combined with several stages of centrifuges.

Centrifuges use centrifugal force to effect separation of mediums of differing densities. As shown in FIG. 2, typically a pair of centrifuges operate at high speed to remove coarse and fine solids from the sand trap. The partially cleaned liquid is recycled to the active mud system. The quantity of ultrafines in the recycled liquid is a function of the centrifuge efficiency which in turn is affected by the mud viscosities employed. Use of a higher viscosity mud to entrain and lift particles from the well, also lessens the effectiveness of centrifuges to reject ultrafines. This results in a buildup of about 5 micron and smaller ultrafines in the recycled mud. To counter the buildup and avoid excessive mud densities, several approaches have been used.

One approach is to occasionally reject whole mud to a sump and add fresh, clear carrier liquid to dilute the recycled mud. As discussed above for sumps, this option is preferably avoided.

Within the past decade, the industry has responded by treating ultrafines buildup using a process known in the industry as "enhanced polymer flocculation of solids". In a separate tank, ultrafine solids are agglomerated using electrolyte and flocculating polymers to form floc in the 10–20 micron or larger size range. One of a pair of whole mud-processing centrifuges can be switched to treat flocculated ultrafine solids feed. The centrifuge spins the floc dry, dumping the floc underflow for removal by front end loader and recycling clarified liquid to the active system.

Weighted drilling muds, using barite, are used to control higher bottom hole pressures and are generally associated with the production of even higher fractions of ultrafines in the mud. Use of hydroclones results in expensive loss of barite. Adjustable g-force centrifuges are sometimes used to match the characteristics of the mud, which has initially been screened to remove the larger solids. A first stage centrifuge then removes high density ultrafine barite. The recovered barite is recycled to the active system. The overflow mud contains undesirable low gravity solids and some undesirable ultrafine barite. Enhanced polymer flocculation is again employed on the overflow. The flocs are processed in a second stage centrifuge for rejection of undesirable ultrafines.

In the past, selective flocculation has been attempted for separating undesirable ultrafine drilled solids from mud without rejection of the desirable ultrafine bentonitic component. Bentonite is generally added to alter viscosity and filtrate loss control characteristics in a drilling fluid. Selective flocculants are used to produce a very light floc from drilled solids, but not from bentonitic solids. Typical selective flocculants, are "MF-1" and "MF-55" (trade names of Kelco Oil Field Group Inc., U.S.A.), which are high-molecular weight, non-ionic polyelectrolytes. If flocculated ahead of the shaker, the fragile floc tended to blind the shaker screens and thus water sprays have been required which unfortunately break up the flocs. If flocculated after the screens, the floc was too fragile to survive centrifuging or hydroclone separation processes. Accordingly, an extra tank or reserve pits, providing quiescent conditions, have been used for settling of the floc. Unfortunately, the resultant flocs are so light, they are difficult to detect; the result being that occasional dumping of the whole tank to a sump was necessary. Due to the above operational difficulties, the potentially beneficial practice of selective flocculation has not been widely practised.

While centrifuges reject less liquid, they are associated with a number of disadvantages including:

The centrifuges themselves are very expensive. Their high speed use over prolonged periods make them prone to mechanical failures. Expensive centrifuge bowls need to be regularly replaced at significant cost and loss of time. Shifting operation from a first stage of centrifuges to include a second stage for the treatment of floc can nearly double the daily operating costs;

As a result of the demanding nature of maintaining centrifuges, oil companies and drilling contractors usually do not own centrifuges but instead rent them from specialized service companies;

Occasionally, it is not physically possible to process all of the mud using the provided centrifuges due to factors including: economic restraints on the number of centrifuges available; the volume of mud being circulated; and the mud viscosity.

Having reference to the particle size distribution chart of FIG. 3, the effectiveness of each of the solids removal components is summarized. More particularly, a shale shaker can remove a medium cut of 44 micron and greater, a desander has a medium of cut of about 35 microns, a desilter has a cut of 15 microns and finally centrifuges, ideally processing low viscosity liquids and without flocculation, have a cut of about 2–3 microns.

In contrast with ideal conditions however, as drilling deepens, mud viscosity is raised, reducing the centrifuge effectiveness and permitting ultrafines of 6 microns and less to build up to about 90% of the solids total content.

Due to environmental concerns over large sump volumes resulting from the use of desanders and desilters, the drilling industry has been under pressure to abandon the highly effective use of hydroclones for controlling mud density and has been driven instead to apply alternative techniques such as centrifuging. Unfortunately, as a result of the limitations of such techniques, over time, the industry has accepted increased concentrations of ultrafines in the recycled muds as being a necessary evil. Drilling mud densities have climbed to 9.2–9.4 pounds/U.S. gal or higher, adversely impacting drilling rates.

In related separation art, non-centrifuge-based separation apparatus exist which practice gravity separation and filtering. Such apparatus is disclosed in U.S. Pat. No. 2,941,668 to Maus. Generally Maus teaches apparatus comprising:

a liquid-filled, rectangular sump or settling tank having vertical walls, into which liquid containing solids is fed;

a continuous conveyor having a first end immersed in the liquid adjacent the bottom of the tank, and a second end elevated free of the liquid;

screened buckets on the conveyor for collecting solids; and a vibrating trough positioned below the second end of the conveyor and above the liquid for receiving collected solids More particularly, the Maus system is directed to separation of chips and the like contained in liquids. The screened buckets follow a substantially rectangular path; descending vertically into the tank, turning 90 degrees to collect chips from the bottom of the tank, then turning 90 degrees to ascend vertically up and out of the tank.

The screens are provided to avoid lifting liquid out of the tank. The buckets tip over to dump the bucket's contents onto the collection trough. The trough is inclined and vibrates to urge the solids to flow down the trough to discharge external to the tank. Clarified water is only drawn from the protected interior of a filtering drum. A portion of the filter drum extends above the liquid and is cleaned by blasts of air or clarified liquid, returning the solids and any liquids to the tank.

Limitations of the apparatus of Maus include:

inability to separate solids smaller than the bucket's screen size;

no means to clean the buckets of residual solids; and an inability of the system to dewater interstitial water from solids contained in buckets.

While the Manus method and apparatus are applicable to some coarse solids situations, they are not well-suited to liquid containing mixtures of solids and ultrafines, or floc.

More particularly, the Maus system does not:

provide means for sustainably separating ultrafines from the liquid; or provide means for dewatering flocs.

There exists therefore a need for apparatus and method suitable for effectively clarifying liquid containing both solids which settle and ultrafines which may not.

SUMMARY OF THE INVENTION

The present invention arose from a recognition of the need to better remove solids from used drilling mud and reduce its density for improved drilling. Additionally, the removed solids should be free of excess liquid to facilitate disposal. It was noted that the solids characteristics fell into two categories:

typically, that the largest majority of the solids were undesirable ultrafines, being the most challenging to separate; and also that there was a portion of the solids which readily settle.

It was further recognized that a beneficial form of drilling mud management, specifically selective flocculation, was not being effectively practised due to the inability of centrifuges to dewater the fragile flocs and the difficulty for operators to judge the state of accumulation of flocs within drilling rig tanks, requiring periodic dumping of the whole mud, with accompanying increase in sump volume.

Generally, in accordance with the present invention, a method is provided which effectively separates both coarse solids and ultrafine solids from a liquid stream, to produce a substantially dry solids discharge and a clarified liquid. Further, in response to greater levels of ultrafines, enhanced polymer flocculation may be practised; the resulting flocs being similarly separated. Apparatus comprising a combination of a settling tank, an endless conveyor of a plurality of screen filters, a screen vibrator and directed air streams are employed.

More particularly, the drilling mud is introduced into a settling tank. Coarse solids settle preferentially to the tank bottom. Ultrafines solids remain in suspension. Screen filters, preferably in the form of buckets having relatively coarse screens, are conveyed through a prolonged traverse of the liquid. Ultrafine solids, up to several orders of magnitude smaller that the screen openings, are captured on the screens by filtering the liquid through an ever finer build-up of filter cake. Ultrafines can be collected with 12–80 mesh (1680 to 177 micron) screen material. By continuously filtering the liquid with a large number of screens, effective collection of suspended solids is achieved. Further, the screens dredge coarse settled solids from the tank bottom. Collected coarse and ultrafine solids are dewatered by vibration of the screens and the impinging of streams of air onto the solids on the screens.

Should the fraction of ultrafine solids in the liquid increase or the particle size diminish so much as to overwhelm the dredging and filtering, then a flocculation step may be practised. The liquid containing solids is treated with an electrolyte and polymer flocculant to form flocs. The collection of solids can then be practised as described above, collecting the larger floc rather than dispersed solids. The low liquid volumes contained in the settling tank promote more efficient flocculation requiring less flocculant to obtain the same results used in a sump or centrifuge operation. Further, one can use even less flocculant, forming softer and more fragile flocs. The gentle separation and collection action of the screened buckets do not require the tightly bound flocs that the centrifuge applications demand.

The continuing trend towards the use of centrifuges and away from the use of desilters (blamed on the excessive liquid losses) results in lost solids-removal opportunity. The capability of hydroclones to remove undesirable solids is considerable, as shown in the following comparison of typical performance:

|  | Desilter | Centrifuge |
| --- | --- | --- |
| Fraction of solids rejected | .188 | 0.532 |
| Flow rate (gpm) | 5 | 1 |
| Solids rejected (lb/hr) | 1223 | 691 |

The high liquid loss associated with desanders and desilters may now be addressed by treatment of the hydroclone underflow using the present invention. As shown in the comparison above, while desander and desilters produce a less dense solids-laden discharge stream, the flow rate can be so much higher than that produced by a centrifuge system, that the solids rejection capacity can actually be significantly higher. Coupled with the present invention to conserve the liquid which was previously lost, high throughput and low mud densities can be achieved.

In one broad aspect then, a novel method for the separation of solids, including ultrafines, from liquid is provided, the process comprising:

providing a settling tank, said tank having a bottom and first and second ends;

flowing liquid containing solids into the tank's first end, preferably directed to discharge adjacent to the tank bottom;

maintaining a liquid level in the tank, preferably using an overflow weir at the tank's second end;

separating at least a portion of the solids by gravity for deposition on the tank's bottom;

continuously advancing a plurality of spaced-apart screens along an endless path which includes at least descending into the liquid from a first point above the liquid at the tank's second end to a second point on the tank's bottom, then advancing laterally to a third point on the bottom unique from the second point and adjacent the first end of the tank, and then, ascending to exit the liquid so as to return to the first point, wherein a portion of the solids in the liquid are collected on the screens by filtering the liquid through said screens, the screens filtering progressively finer solids from the suspended solids through the formation of a filter cake of solids on the screens, and those solids which have settled by gravity are collected by advancing the screens to dredge the bottom of the tank between the second and third points;

dewatering the collected solids by vibrating the solids-containing screens which lay along the ascending portion of the path and are above the liquid level, and further by directing blasts of air onto the screen contents;

advancing the screens to a point external to the tank;

dumping dewatered collected solids by inverting the screens and dumping of the collected solids for recovery external to the tank;

dumping residual dewatered solids from the screens by directing air onto the back of the inverted screens for recovery external to the tank;

withdrawing clarified liquid from the second end of the tank at a point adjacent the surface of the liquid.

In another aspect of the novel method, for water-based liquids, separation of solids is enhanced by flocculating the solids in the liquid as they flow into the first end of the tank, wherein floc is formed and are separated from the liquid as were the solids, as described above.

In yet another aspect of the process, the viscosity of the liquid can be adjusted by dilution of the incoming liquid with fresh or process clarified liquid for reducing the viscosity. Viscosity of the liquid affects settling rate, tailoring which fraction of the liquid's solids may be recovered by dredging or by filtering.

In yet another aspect of the process, a slip stream of solids from the liquid is concentrated using conventional means, such as by hydroclones; the solids-concentrated flow is then delivered to the tank's bottom for dredging by the screened buckets.

In a staged application of the process, solids may be first washed in the apparatus by mixing coarse solids, associated with ultrafines, with recycled clarified liquid so as to create as suspension of ultrafines in the tank's liquid. Cleaned coarse solids are recovered using the screened buckets. Then, when the ultrafines in the water become sufficiently concentrated, the flow of solids is discontinued and the process of the present invention is practised for flocculating, collecting and dewatering floc to recover the ultrafines separately from the cleaned solids.

In yet another aspect of the invention, the dewatered solids are cyclically subjected first to compression for liberating additional water from the solids, and then to decompression so that liberated water may freely drain away.

In a broad apparatus aspect then, novel apparatus is provided including a settling tank for the separation of solids from liquid, said tank having a tank bottom, which preferably has sloping side walls, a first liquid receiving end and a second solids discharge end, comprising;

means for feeding liquid into the first end of the tank, preferably adjacent the tank's bottom;

means for maintaining a liquid level in the tank, preferably being an overflow weir at the tank's second end;

a plurality of screens, preferably in concave bucket form, spaced apart on an endless loop of conveyor, such as link chain, for screening the tank's contents;

means for continuously advancing said conveyor and screening means through the tank;

means for guiding said conveyor along a path which includes at least descending into the liquid from a first point above the liquid at the tank's second end to a second point on the tank's bottom for traversing the liquid and collecting solids suspended therein, then advancing laterally to a third point on the bottom unique from the second point and adjacent the first end of the tank for dredging settled solids and then ascending to exit the liquid and then ascending to the first point for again traversing the liquid and collecting solids suspended therein;

means for vibrating those screens which lay along the ascending portion of the path and are above the liquid level for dewatering of collected solids, preferably by supporting the screens on a vibrating table;

means for directing a stream of air onto the contents of the screening means for further dewatering of the collected solids, preferably additionally directing air through the back of the screen for clearing the screen and thereby providing a means of escape for free water;

means associated with the first path point for inverting the screens to dump the dewatered solids for recovery external to the tank;

means for directing air onto the back of the screens for cleaning residual solids therefrom and recovering them external to the tank; and means for removing a clarified liquid from the second end of the tank, preferably using an overflow weir.

BRIEF DESCRIPTION OF THE DRAWINGS

FIG. 7a is a side view of the screened bucket associated with one link of chain;

FIG. 7b is a front view of the screened bucket;

FIG. 7c is a front view of a screen element;

FIG. 7d is a front view of the screen's skeletal frame;

FIG. 8 is a schematic side view of the plunger pump and compactor;

DETAILED DESCRIPTION OF THE PREFERRED EMBODIMENT

Figure 1:
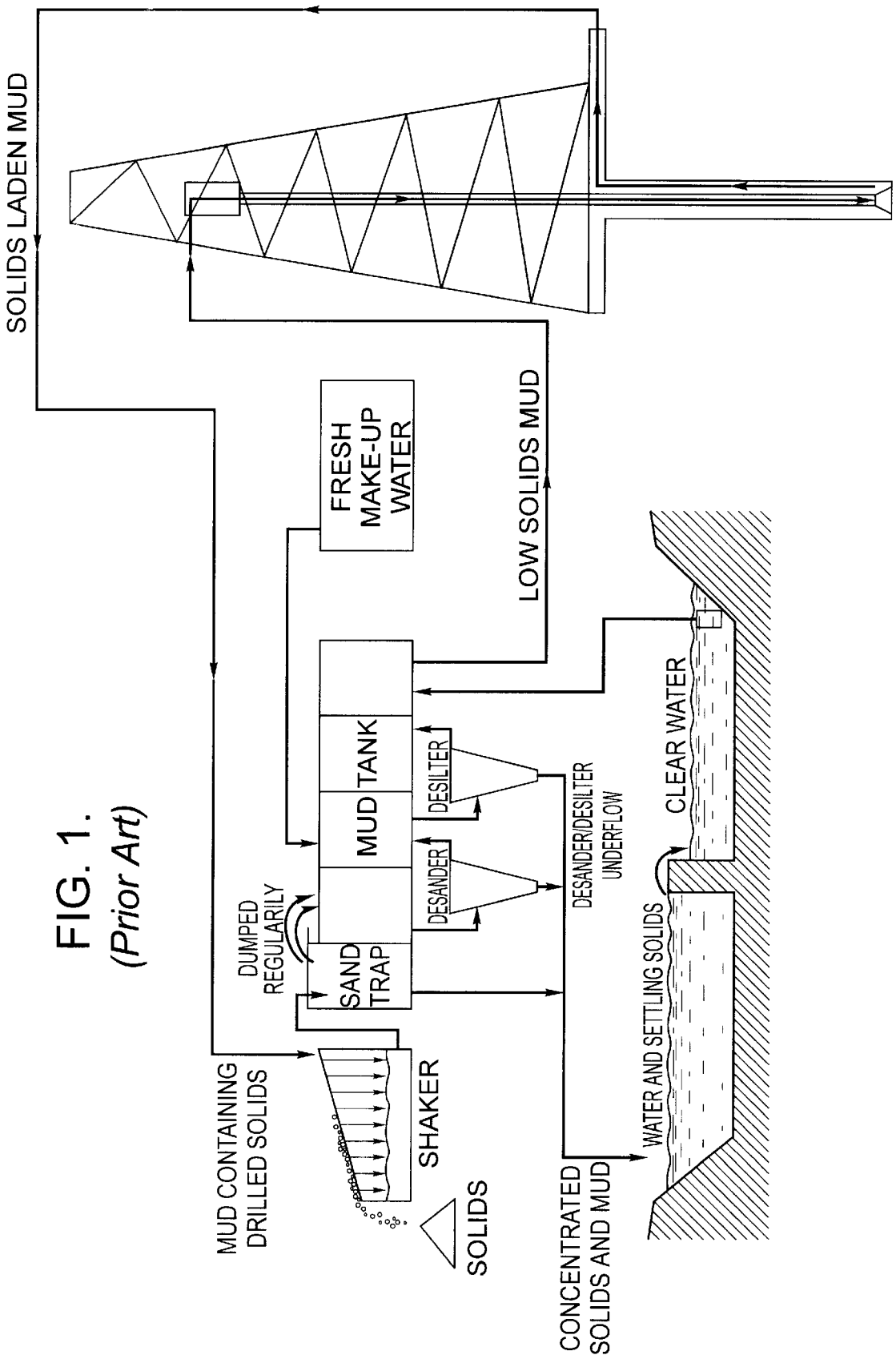
FIG. 1 is a schematic of the prior art process of treating drilling mud using a sump system.
Figure 2:
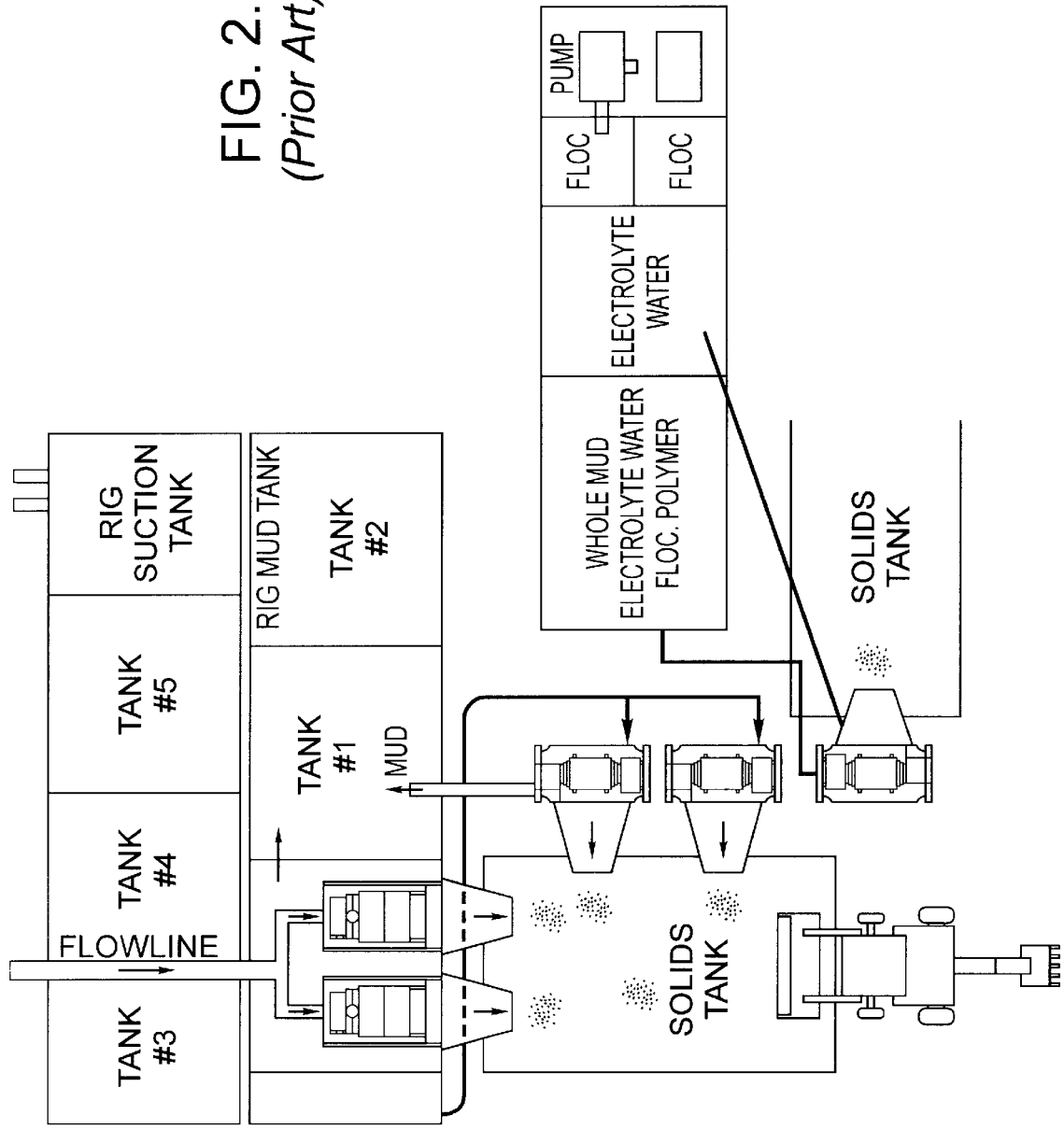
FIG. 2 is a schematic of the prior art process of treating drilling mud using a centrifuging system.
Figure 3:
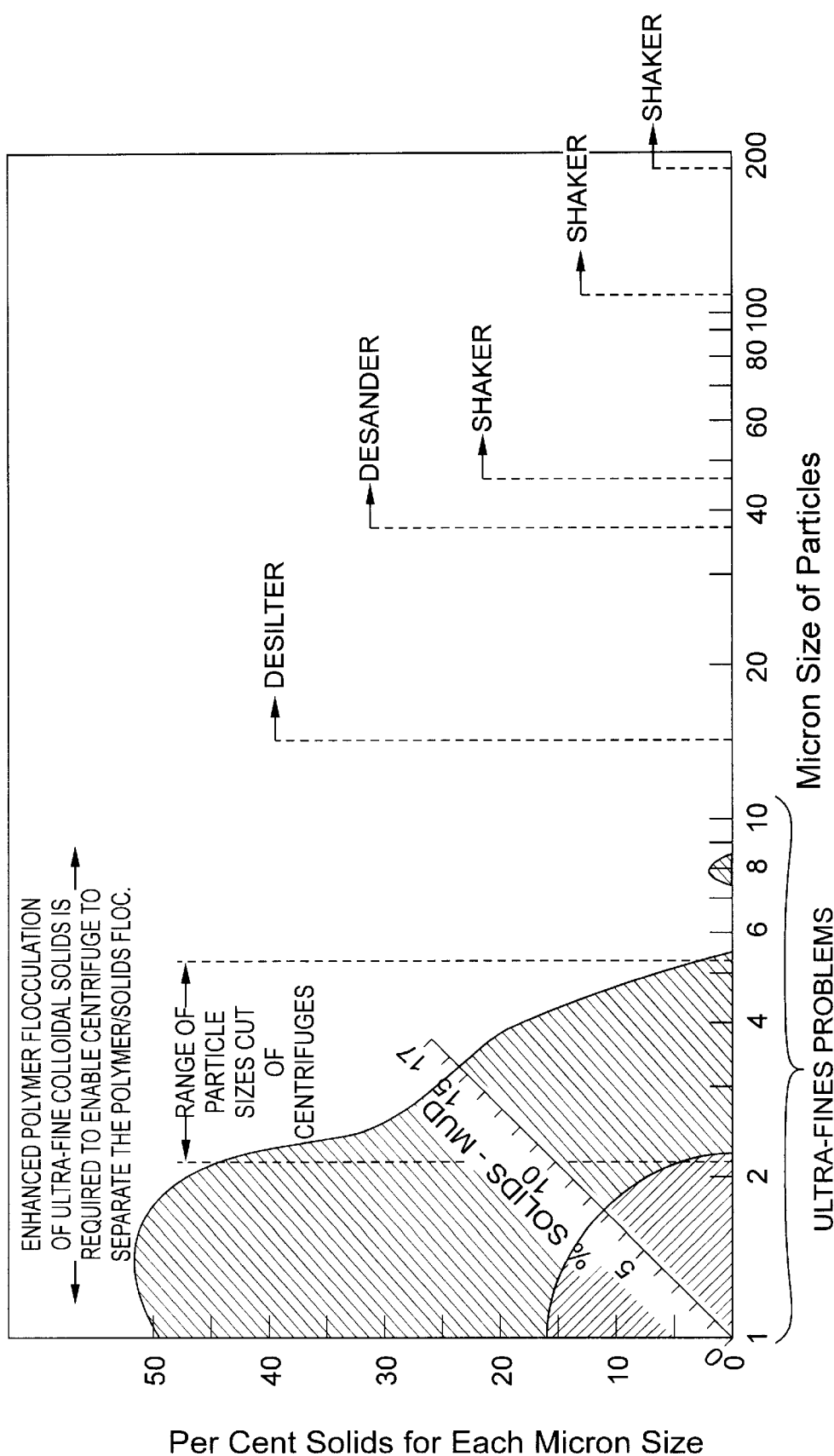
FIG. 3 is a particle distribution curve for a typical used drilling mud showing the effect of various prior art solids removal devices.
Figure 4:
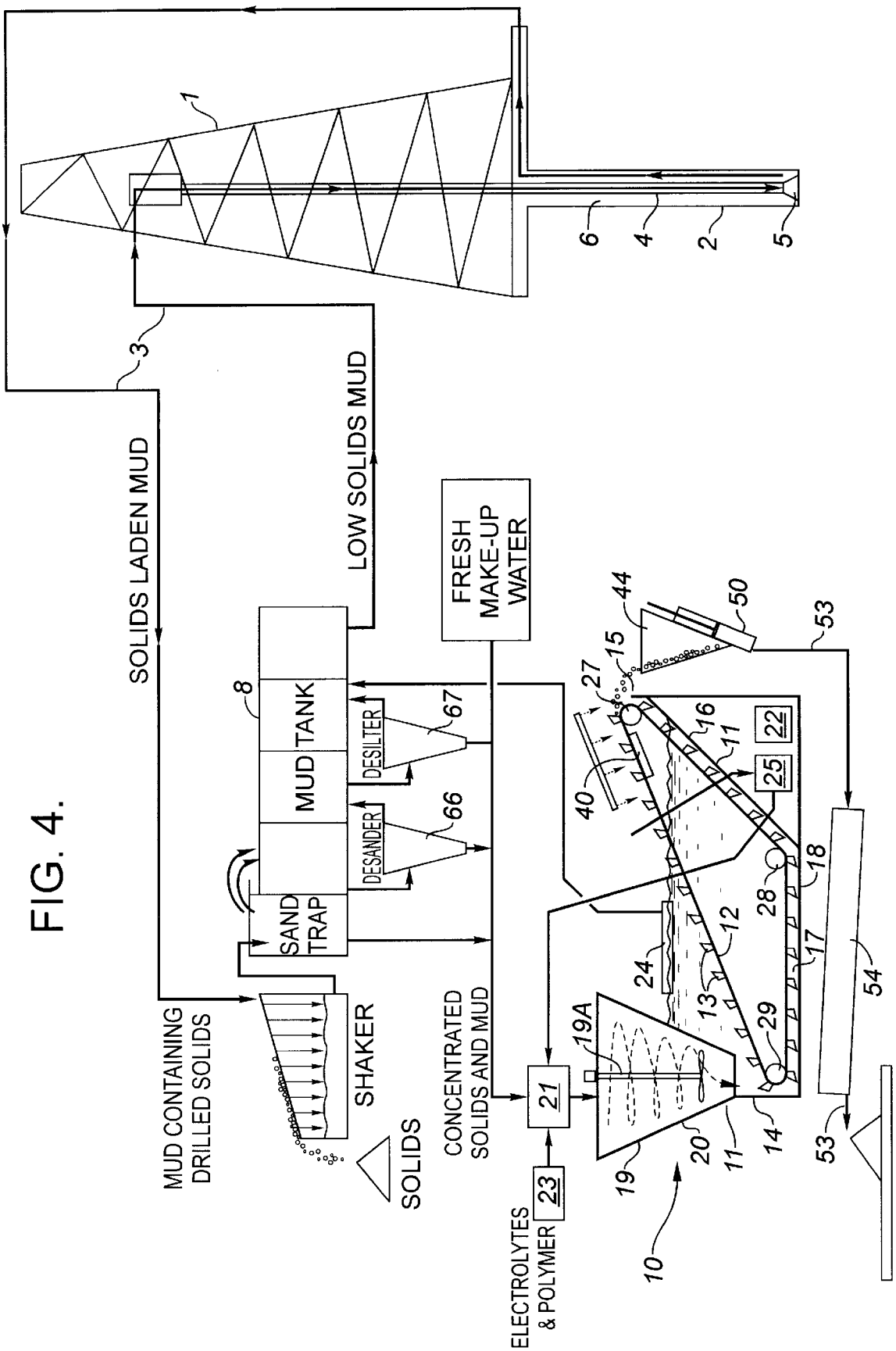
FIG. 4 is a schematic of an embodiment of the present invention as applied to separating solids from used drilling fluids.

Having reference to FIG. 4, a conventional oil well drilling rig 1, positioned over a well 2, is shown. A mixture of a carrier liquid and additives (such as bentonite clay), known as drilling fluid or mud 3, is circulated to the rig 1 and down into the well 2 through tubular drilling string 4 to a drilling bit 5. Hydrocarbons, such as diesel, may be used as the carrier liquid; the resulting fluid being referred to as "invert muds". However, the description of the preferred embodiment as follows refers to the use of water as the carrier liquid.

Mud 3 containing solids is circulated back to the rig 1 via the annular space 6 between the subterranean wall of the well 2 and the drill string 4, for discharge at the surface. The returned mud 3 is conditioned at ground surface to remove solids. More particularly, clarified mud is recycled to a mud tank 8 of an active mud system for the addition of fresh chemicals, mud constituents and make-up water as necessary. Thus conditioned, the mud 3 is recycled to the well 2.

Mud is optimally maintained at liquid densities of less than 9.0–9.1 pounds per U.S. gallon (lb/gal). The density of recycled mud is controlled by separating undesirable solid matter from the mud.

Apparatus 10 is provided for continuously separating or stripping solids from the returned mud and recycling clarified liquid back to the mud tank 8. The clarified liquid may consist of mud stripped of undesirable solids or clarified carrier liquid.

The apparatus 10 comprises a settling tank 11 having a solids-bearing liquid inlet end, an endless conveyor 12 carrying a plurality of spaced-apart, screened buckets 13, a solids dewatering section, a substantially dewatered solids discharge and a clarified liquid discharge.

Figure 6:
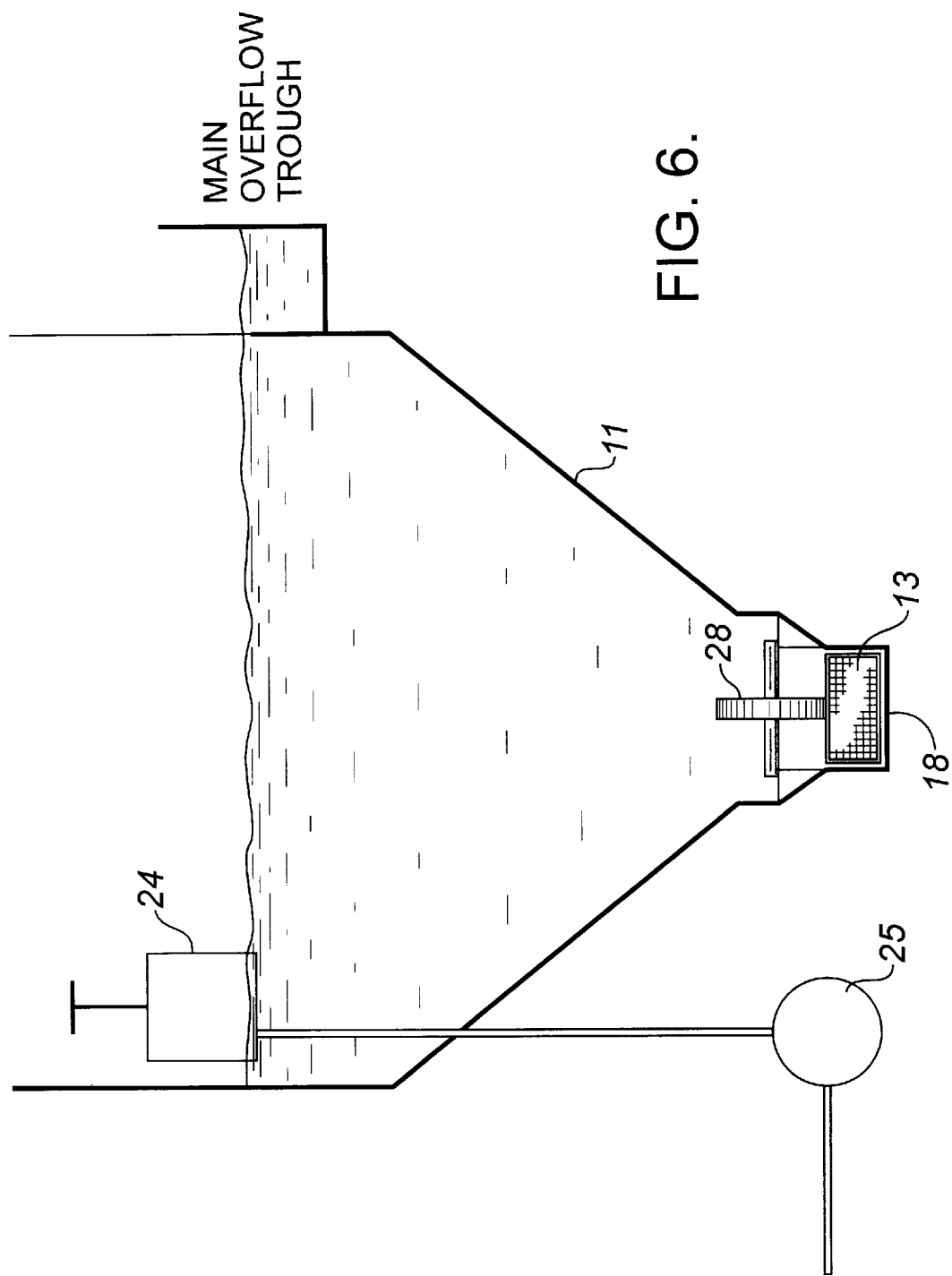
FIG. 6 is a partial cross sectional end view of the settling tank, sloping side walls and buckets.
Figure 7B:
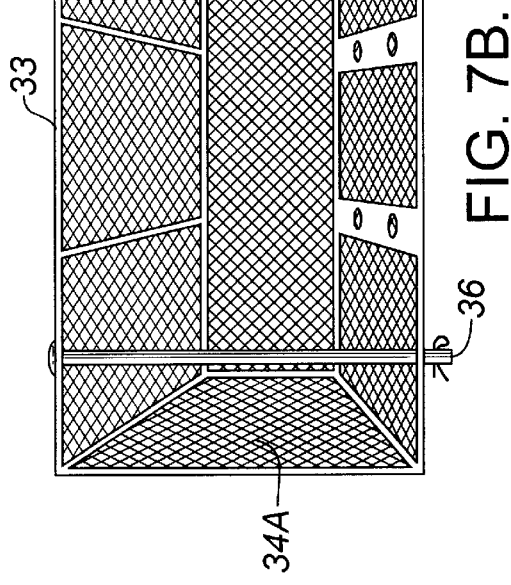
FIGS. 7a–7d illustrate the construction of the screens buckets. More particularly.
Figure 7D:
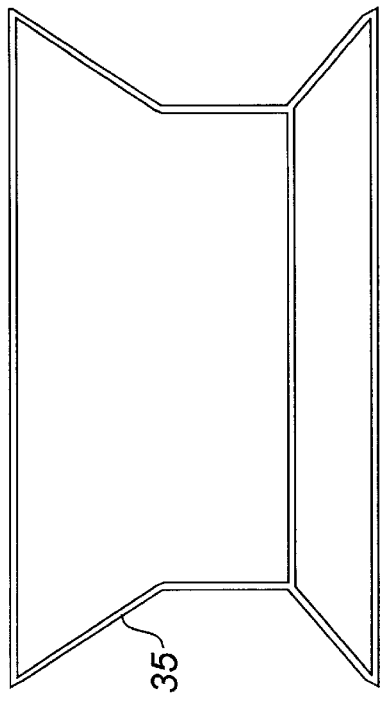
Figure 7A:
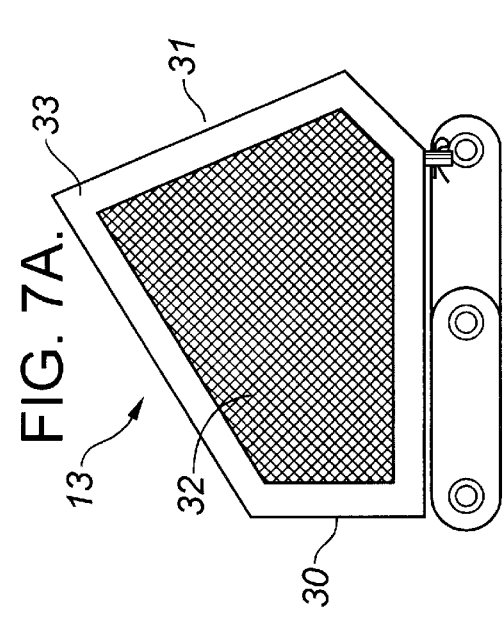
Figure 7C:
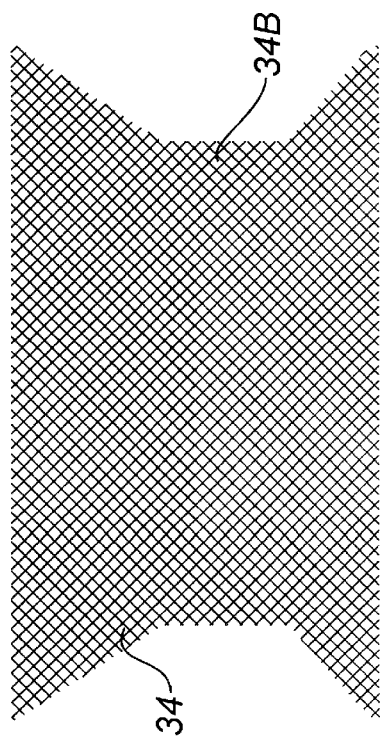

The settling tank 11 is rectangular in plan with a first mud inlet end 14 and a second solids discharge end 15. The tank 11 has a sloping wall 16 at its second end 15 and sloping side walls (FIG. 6) which taper inwardly and downwardly to form a narrow rectangular trough 17 in the tank's bottom 18.

An 8 foot diameter cone tank 19 extends downwardly into the first end 14 of the settling tank 11 and has a 15" diameter circular discharge adjacent the bottom of the tank 18. The cone tank 19 itself forms the end wall 20 of the first end 14 of the settling tank 11. A mixing tank 21 is located atop and discharges into the cone tank 19.

A flow of mud 3 is directed from the drilling rig to the mixing tank 21 through desanders 66 and desilters 67 or from a dedicated pump 22. A variable speed stirrer 19a in the cone tank 19 imparts circular movement to the liquid residing therein.

Polymer mixing tanks 23 enable preparation of batches of flocculant. Granular, dry polymer is pneumatically transported from hopper, by tube, to mix with the appropriate carrier liquid.

An adjustable overflow weir 24 adjacent the second end of the tank 15 establishes a 6 foot deep liquid level in the settling tank 11, establishing a liquid volume of about 4000 gal. Pump 25 recycles a flow of clarified liquid, recovered over the weir 24, to the mixing tank for mixing with the mud 3, any fresh dilution water, flocculant and electrolytes. Net clarified liquid production which overflows the weir 24 is preferably directed back to the active system by gravity.

The variable speed conveyor 12, comprising an endless loop of 4" link center×4.19" wide link-chain 26, follows a substantially triangular path through the tank.

Figure 5:
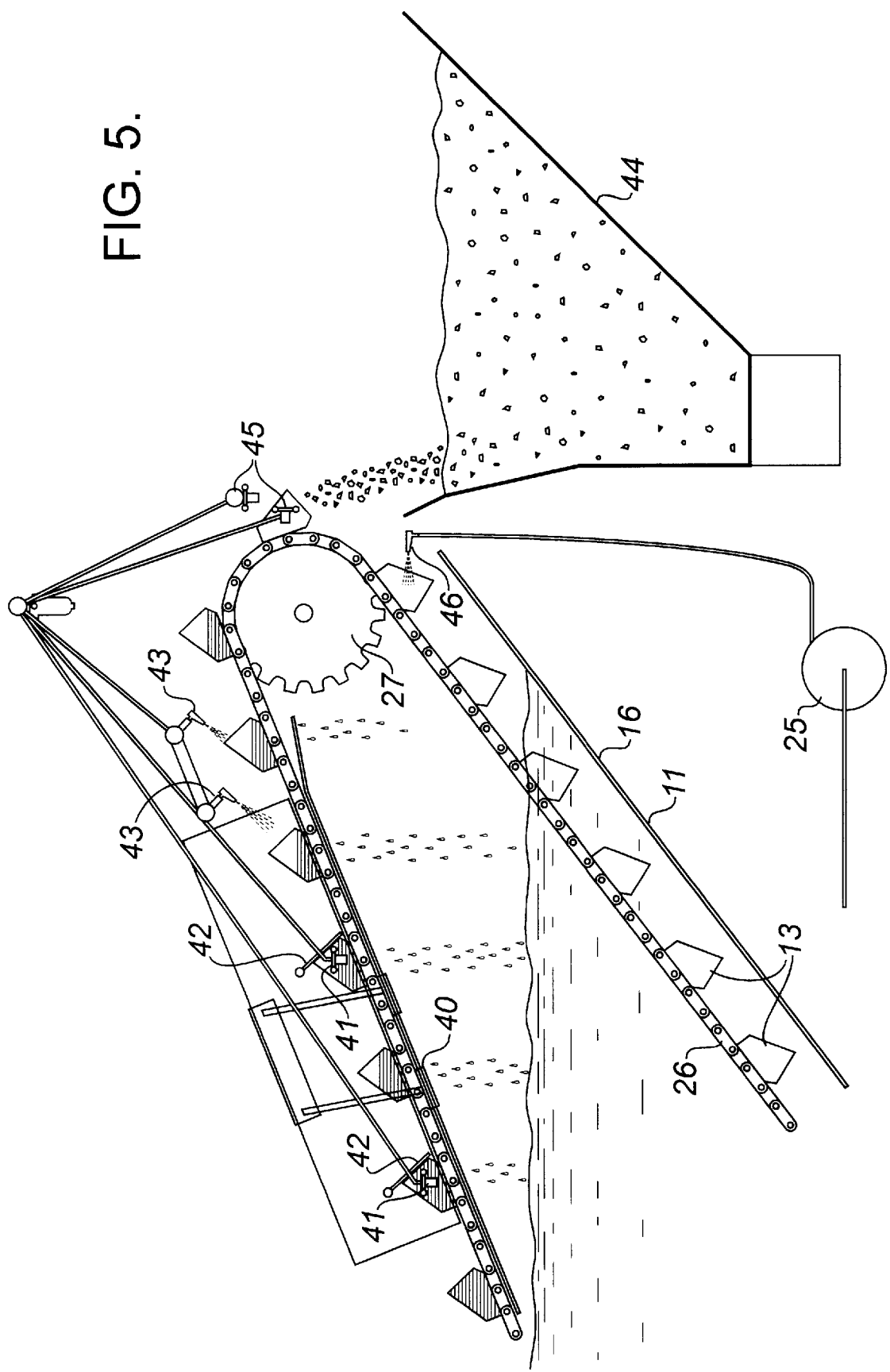
FIG. 5 is partial cross-sectional view of the link-chain conveyor and buckets as they invert to dump out collected solids.

As shown more clearly in FIG. 5, the buckets 13 are affixed to the chain 26, spaced about 12–15 inches apart along its 30–40 foot length. The buckets 13 extend radially outwardly from the loop of chain 26.

The chain 26 is typically driven at about 1 lineal foot/sec using drive sprocket 27 located at the tank's outlet end 15, above the tank's liquid level. The chain 26 descends parallel to the sloping end wall 16, entering the liquid in the tank 11. Buckets 13 depend downwardly from the chain 26 and advance substantially parallel to the sloping end wall 16. A guide sprocket 28 located at the bottom of the sloping end wall 16 turns the chain 26 so that the buckets 13, which now depend downwardly, follow a path parallel to and contacting the tank's bottom 18. The tank bottom 18 preferably has inserts made of Teflon to minimize wear to both the tank 11 and buckets 13. A 10" diameter tail sprocket 29, located at the base of the first end wall 14 turns the chain 26 almost fully about to return, along a protracted, diagonally upward path through the liquid to the head drive sprocket 27. On the ascent, the buckets 13 extend upwardly from the chain 26. The chain exits the liquid adjacent the second end 15 to complete the loop and round the head sprocket 27.

In other words, the endless conveyer 12 guides the buckets 13 from the head sprocket 27, on an angled descending path into the liquid paralleling the sloped end wall 16, a horizontal path along the tank bottom 18, and finally along an ascending, diagonal path from the bottom of the tank's inlet end 14, back to the head drive sprocket 27 at the second end 15, above the liquid.

Having reference to FIGS. 7a–7d, each bucket 13 defines a right prism volume, having a rectangular 14" wide by 3" tall backing wall 30, a leading rectangular 8" tall×14" wide opening 31 and substantially trapezoidal 8" deep side walls 32. Each bucket is constructed of a skeletal framework 33 which supports screen material 34. Other than the side screens 34a, each top, back and bottom screen is formed of a unitary elongate rectangular screen 34b and skeletal frame 35 which is quickly installed by conforming the screen to the "U" shape bucket and is secured therein with quick release pins 36 extending across the bucket opening 31. The passing size of screen 34 varies between 12–80 mesh. Each bucket is removably connected by bolts to a mounting bracket formed in a link of the chain.

The discharge of the cone tank 19 is positioned adjacent the bottom of the tank, just above the opening of the buckets 13 as they round the tail sprocket.

Once the ascending portion of the conveyor emerges from the liquid, the chain 26 and buckets pass through a dewatering section comprising a vibrating table 40 and air nozzles. The chain and buckets are guided over the table 40 and support their weight to maximize energy transfer. A Teflon surface (not shown) minimizes wear.

Having reference once again to FIG. 5, air nozzles 41 blast streams of air through the screens on the sides of the buckets. An array of stationary rubber flaps 42 depend downwardly into the path of the buckets, temporarily blocking the bucket openings as they advance across the vibrating table. The side air nozzles 41 are a vortex type which induce and amplify air flow from a 50 psi, 20 scfm source to discharge air at 370 scfm. Such side vortex nozzles 41 are available as Trans-Vectors model 913 from CFM Air Limited, Calgary, Alberta.

One or more banks of air vortex nozzles 43 (two banks shown, four nozzles per bank), in-line with the conveyor, blast high velocity air into the openings 31 of the buckets 13. Each in-line air nozzle provides about 80 scfm using an air source of 4.5 scfm at 50 psia. Such vortex nozzles are available as Trans-Vectors model 901 from CFM Air Limited, Calgary, Alberta.

The buckets 13 are inverted over the head sprocket 27 and dump their solids contents into a discharge hopper 44 located outside the tank.

An additional bank of four in-line and two side 370 scfm air vortex nozzles 45 are directed to blow air through the screens 34 from the outside of the buckets 13, dislodging substantially any remaining solids from the screens.

Nozzles 46 spray the outside of the buckets once they are descending once again into the tank 11. The nozzles 46 are supplied from the clarified liquid pump. The clarified liquid pump 25 or a dedicated pump 22 can also be used to supply wash bars (not shown) to aid in washing down the tank at the conclusion of operation. A port (not shown) at the bottom 18 of the tank may be opened at the conclusion of operation to swamp out remaining solids and liquid.

As shown in FIGS. 4 and 8, a 12"×12" plunger pump 50 with a roughly 2 foot stroke, similar to that known for pumping sewage, is located at the base of the discharge hopper 44. When plunger 52 is retracted, a cavity 51 in the pump 50 is opened to the base of the hopper, permitting solids to flow into and charge the pump. On the forward stroke, the plunger 52 displaces the solids charge, pushing it forwards. The pump generates about 60 psi of pressure, sufficient to deliver the solids product through a 200' long, 4" diameter discharge line 53. A flow valve 71 isolates the discharge line to prevent backflow on the pump's backstroke.

Figure 9A:
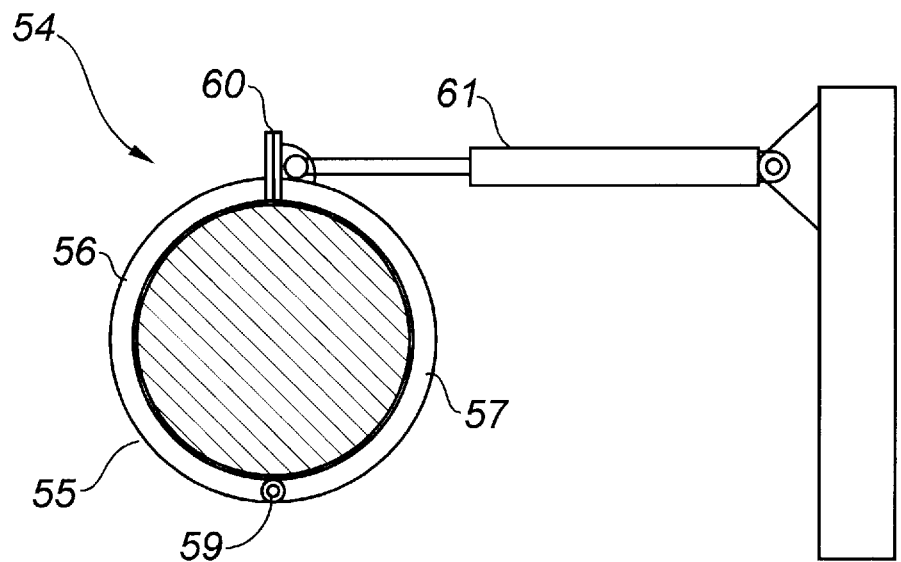
FIGS. 9a and 9b are cross sectional views of the compactor, depicted in open and closed positions.
Figure 9B:
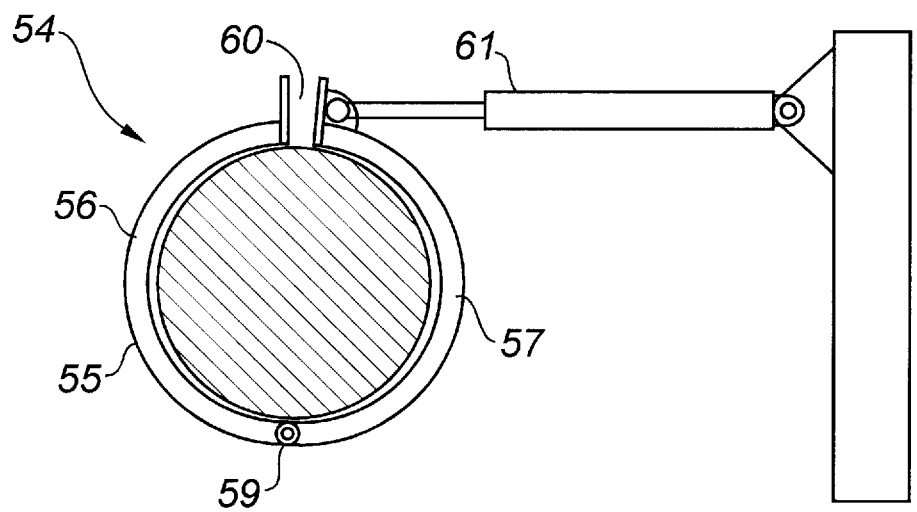

A rigid length of conduit, or compactor 54, is fitted into the discharge line 53. The compactor comprises a 12 foot long length of 10" diameter cylindrical pipe 55 split in half longitudinally, forming two hemi-cylinders halves 56,57. The halves 56,57 are hinged along one split side 59. The opposing split side 60 is oriented to face upwardly. The upper split 60 is mechanically locatable, using hydraulic cylinders 61, between a sealing, pressure-containing closed position (FIG. 9a, 10a—maintained during the plunger pump's forward pressurizing stroke) and an upper split open, pressure releasing position (FIG. 9b, 10b—maintained during the pumps backstroke—when the pressure reduces). The compactor 54 is located above the settling tank 11 for permitting any reclaimed water to gravity drain into the settling tank 11.

The apparatus 10 is wholly mounted on a trailer for ease of transport to a drilling site.

Using the above apparatus, novel separation processes may be practised.

As described previously, a critical aspect of maintaining efficient well drilling operations is to control the accumulation of undesirable ultrafines in the drilling mud. Particularly as the drilling deepens, and after mud-up, undesirable ultrafines quickly accumulate and can cause detrimentally high mud densities.

Accordingly, in a first embodiment, the preferred separation process comprises treating solids-concentrated water-based drilling fluids using flocculation and the apparatus of the present invention.

More specifically, as applied to water-based drilling fluids returning from a well, the apparatus is operated in the following manner.

Referring again to FIG. 4, a liquid level of 4000 gal of clear water is established in the tank 11. Thus, the starting viscosity of the tank's liquid is low (basically 26 sec/quart) which initially aids in settling of contained solids. Dirty drilling fluids, or mud, are drawn from the sand trap 65 and are processed through desander 66 and desilter 67. Overflow from the desander/desilter 66,67 is recycled back to the rig's tanks 8. The concentrated underflows, 5–10 gpm from the desander 66 and the 3–5 gpm from the desilter 67, are directed to the mixing tank 21. Any solids which accumulate in the sand trap are also directed to the mixing tank. Pump 25 recycles about 40–50 gpm of clarified water to the mixing tank 21 to further promote settling.

When the solids content is no longer sustainable, enhanced polymer flocculation is practised to aid in separating the undesirable ultrafines. The exact nature of the flocculant and electrolytes may vary and is known to those skilled in the art. In the polymer mixing tanks 23, a flocculating solution is prepared, including appropriate electrolytes, such as calcium nitrate. Gypsum or other salts are added as necessary to harden the flocculating solution. Polyacrylamide polymer is added for inducing formation of floc.

Typically $\frac{1}{10}$–$\frac{1}{20}$ pound/barrel (lb./bbl) of polyacrylamide polymer and 1.0–2.0 lb./bbl of gypsum or calcium nitrate is required to form flocs which can be readily handled by the above apparatus. The exact concentrations will vary according to the solids content, the density and the viscosity of the mud. Therefore, as these parameters vary, the quantities of polymer and electrolyte are adjusted accordingly.

An additional 5–10 gpm of fresh water is added to compensate for the increasing volume of the well (volume building) and to make up for evaporative losses. This additional water dilutes the incoming liquid and improves settling.

Solids, including any formed floc, are then discharged from the mixing tank 21 into the cone tank 19. The stirrer 19a induces the mud to spin, urging and concentrating solids at the cone walls prior to discharge from the cone's bottom 18. The stirrer 19a is idled at a slow 20 rpm to avoid degradation of flocs.

As described above, chain 26 slowly carries the screened buckets 13 continuously on a triangular path though the tank 11. During the descending leg of each bucket's journey, the bucket travels diagonally downwards, initially intercepting any solids floating on the surface. The bucket continues downwards, traversing a cross-section of the liquid, filtering and collecting suspended solids.

The screens 34 of the buckets are designed to allow the screen to filter the tank's liquid contents. Relatively coarse screens are utilized in the buckets, typically 12–20 mesh, appropriate for the large floc, finer screens of 40–80 mesh when processing whole mud.

As each bucket traverses the suspended solids in the liquid, the screens progressively plug off (establish a filter cake) reducing the effective screen mesh opening and thereby filtering and collecting ever finer particles.

Along the horizontal bottom leg, the buckets dredge the bottom 18 of the tank 11 to collect solids which have settled.

On the ascent, the buckets 13 round the tail sprocket 29 and assume a solids-carrying orientation with their openings facing substantially forwards and upwardly. Mud discharged from the cone tank 19 has a downward trajectory and the buckets rounding the tail sprocket have an upwards trajectory. The opposing movement results in a differential pressure being formed across the bucket screens, improving the filtering of mud directly from the cone tank. The buckets 13 continue travelling diagonally upwards through the liquid, filtering suspended solids. The angled ascent prolongs the bucket's contact with the liquid. As the buckets leave the liquid, they intercept any additional floating solids.

The solids collection capability of the buckets is significant, being a factor of the conveyor speed, the bucket spacing and the screen capacity. For example, at 20 gpm of incoming liquid into a 4000 gal tank, any associated solids have a residence time of 200 minutes or 3.33 hours. Using 28 buckets spaced on a 35 foot loop of conveyor advancing at about 1 bucket/sec (about 1.25 ft/s), nearly 12,000 bucket screens are exposed to the suspended and settled solids. Even a very thin filter cake, collected upon 200 square inches of filtering area, times 12,000 passes, removes significant quantities of suspended solids.

The collected solids are then dewatered in a series of steps which commence once the conveyor lifts the solids-laden buckets free of the liquid.

Table 40 is vibrated at about 30 Hz to free residual water from the solids. The vibration imparted is sufficient to free interstitial water and yet is not so vigorous as to breakdown any aggregations, such as any flocculated solids. Liberated water runs out through the screens 34 in the bucket.

Blasts of air from the side nozzles 41 assist in dewatering by clearing the side screens 34 for ready passage of liberated water. The rubber flaps 42 aid in retaining solids within the buckets 13 during the air blasts of air.

During or after the vibration stage, the in-line air streams from nozzles 43 massage the contained solids, releasing more water to drain out of the buckets. In some instances accumulated filter cake is displaced, lifted or curled back from solids-supporting screen 34, more readily enabling water to pass therethrough.

The results of the dewatering step on flocculated solids is dramatic. The depth of floc within the buckets tends to reduce to about ¼ their previous loft; the decrease in volume being due to the release of water which returns to the tank.

After this dewatering stage, as the chain 26 and buckets 13 round the head sprocket 27, the openings 31 in the buckets 13 tip over to dump accumulated solids into the discharge hopper 44. The additional bank of six air jets 45 dislodge substantially all remaining solids from the screens which also fall into the discharge hopper 44.

The resulting 15–25 gpm of clarified liquid or water is decanted from the surface of the liquid, flows over the weir 24 and is recycled to the active system mud tank 8 for reconstitution of fresh mud for recycling downhole.

As the buckets again descend, water spray 46 thoroughly washes the buckets 13 of any minor residual amounts of solids which return to the tank 11.

At this point, the solids are substantially dewatered and may be discharged directly to storage. Should remote storage be desired, the solids are routed through the plunger pump.

Figure 10A:
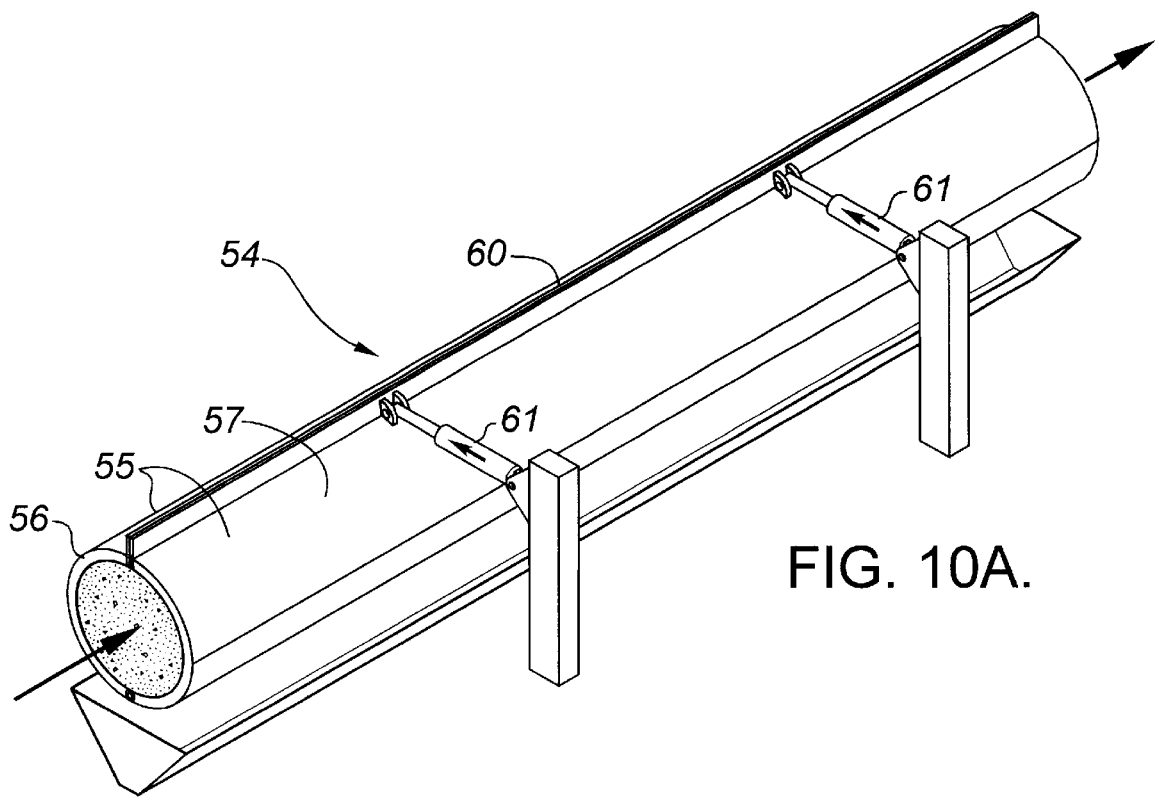
FIGS. 10a and 10b are perspective views of the compactor, depicted in open and closed positions.
Figure 10B:
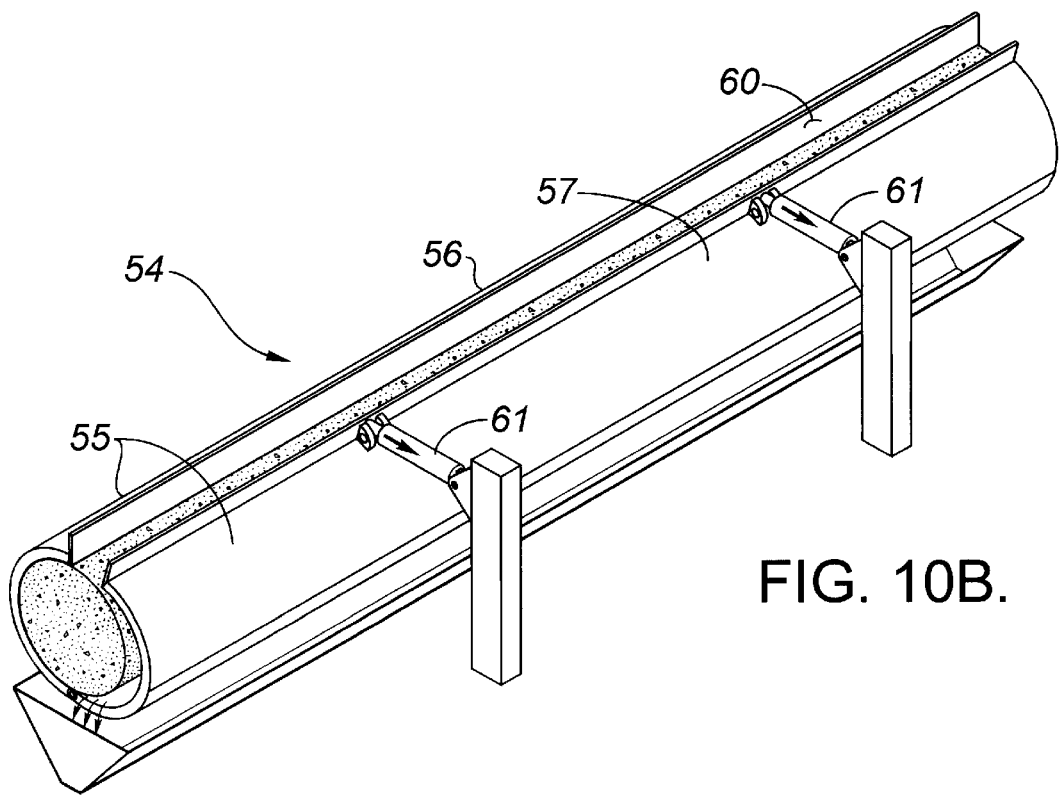

The plunger pump 50 and compactor 54 provide an additional dewatering step. Referring to FIG. 10a, on the forward stroke of the pump 50: the compactor is in the closed position; the line pressure increases; and compaction occurs. The pressure causes water to separate from the solids. Then, referring to FIG. 10b, the compactor's upper split 60 is opened and liberated water trickles free to drain into the settling tank 11.

At this stage the discharge from the buckets is sufficiently dewatered to stack and can be handled by a front-end loader for disposal by land farming and the like.

Figure 11:
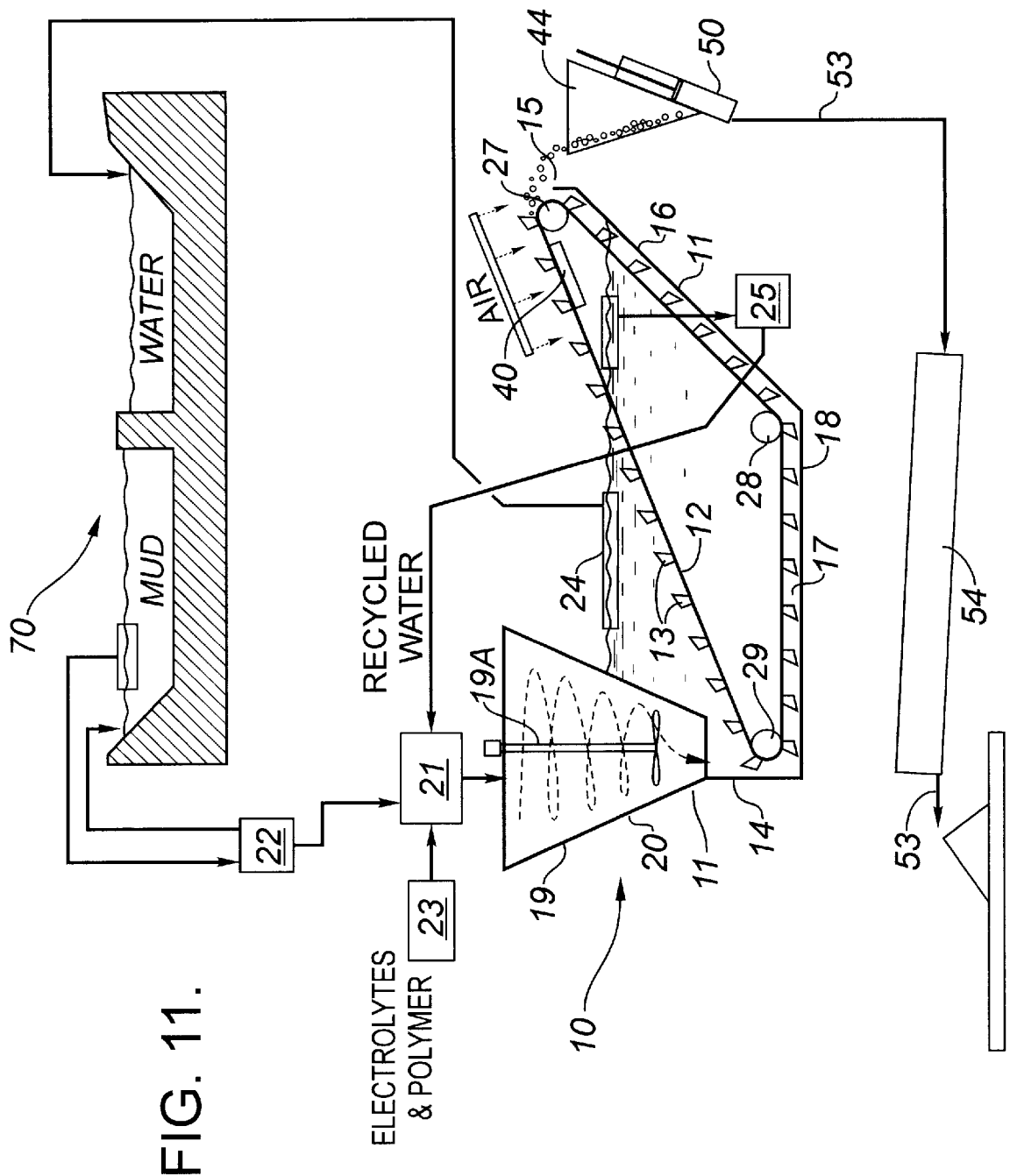
FIG. 11 is a schematic view of an embodiment of the present invention as applied to a pre-existing drilling fluids sump.

The above embodiment is demonstrated in the illustrative examples and by reference to FIG. 11 as follows.

EXAMPLE I

At a drilling site in western Alberta, Canada, 2000 feet of 13¾" surface hole was drilled and 9⅝" casing was run and cemented. The mud density was controlled in the 9.0 lb/gal range by employing the drilling rig's shaker and desilters. The sand trap and desilter underflow were dumped to a series of sumps. Floc water drilling of 8¾" main hole was employed to 5000 feet utilizing gypsum, calcium nitrate and flocculating polymer. The well was then "mudded up" to a gel mud system, by adding bentonite and polymers. Polymer flocculation was continued of mud in the sump. Drilling continued to 6500 feet.

By the time the apparatus of the invention was placed into operation at 6500 feet, the sump had accumulated over 3000 barrels of mud and sludge. Drilling continued to 8000 feet while the apparatus of the invention processed the sump contents.

The apparatus drew sump contents from a 4" floating suction in the sump. A water cannon assisted in loosening settled solids for removal by the floating suction. The apparatus processed 40–80 gpm of the sump contents comprising floc solids, whole drilling mud and solids-laden desilter underflow.

Enhanced polymer flocculation was practised, using 1/20 pound of polyacrylamide polymer per barrel of mud processed. The calcium content or hardness of the floc water was maintained at 600 ppm using calcium sulfate and calcium nitrate.

The conveyor was operated at about 60 ft/min. The buckets employed 20 and 40 mesh screens. At peak processing, over 50 gpm of dewatered solids were discharged for removal to an above-ground, bermed area by front-end loader. Clarified water was recycled to the far, discharge end of the sump where the rig's own 2" suction pump returned this water as dilution water to the active mud system to assist in lowering the mud density.

Drilling densities of 8.9–9.0 lb/gal were achieved which assisted in the fast drilling penetration rates. The well was drilled in a record time of 31 days.

The apparatus processed the entire sump's contents. The apparatus was then removed from the system, leaving about 1000 barrels of clarified water which was sufficient volume building inventory for re-use and permitted the rig to drill to total depth of 9600 feet.

At the conclusion of the drilling, the rig mud tanks contained an additional 400–500 barrels of whole mud which were dumped into the sump and required only a minor mix, bury and cover reclamation operation.

EXAMPLE II

At another drilling site in southern Alberta, Canada, a drilling rig utilized a shaker screen, centrifuge and a sump. Due to the experimental nature of the apparatus, the operator was more comfortable having the apparatus draw from an intermediate sump rather than be coupled directly to the rig's active mud system.

Surface hole had already been drilled to 1200 feet and the shaker, desilter and centrifuge wastes had been dumped into a two-part sump. Midway along the sump, the surface hole-drilled contents of the first sump part were de-watered by the apparatus and decanted into the second part. The drilling wastes were drawn from the first end of the sump and processed through the apparatus. Clarified liquid was discharged to the sump's second end and ultimately recycled to the rig.

Water drilling from 1200 feet then commenced. The shaker sand trap was dumped to the feed end of the sump every 2 or 3 drill string connections. The apparatus was employed to process the existing sump contents and the additional sand trap contents produced during drilling. The apparatus used enhanced polymer flocculation to optimize ultrafines removal, drawing from the sump's feed end and discharged clarified liquid to the sump's discharge end. The rig's own pump drew the clarified water and returned it to the active mud system.

More particularly, prior to drawing feed for the apparatus, flocculant was added to the sump feed end in a concentration of 1/20 pound of polyacrylamide polymer for each barrel of liquid drawn. Calcium levels of 400–600 ppm were maintained with the addition of calcium sulfate and calcium nitrate. Minimal volumes of liquid were maintained in the sump and when all of the water was recycled to the active system (the sump being essentially dry), additional water had to be imported for make-up volume building, any losses, and to aid in maintaining suction for drawing solids into the apparatus.

Once the sump was dry, the apparatus was operating in a manner equivalent to processing mud directly from the rig's active system.

The bucket and conveyor were operated at a 60 lineal feet/min with 40 mesh screens. The vibrator table was operated at 30 Hz. The dewatered solids discharge weighed 10.8 to 11 lb/gal at discharge rates of 30–35 gpm.

The well was drilled to 6800 feet in 12½ days, maintaining 8.9–9.0 lb/gal to the total depth.

Benefits were realized beyond merely maintaining low drilling mud weights. Due to the minimal storage of liquid in the sump, the consumption of calcium electrolytes and polymer flocculant was reduced. Further, reduced polymer could be used, resulting in softer, more fragile flocs. The screens buckets successfully recovered the soft flocs which would not survive the centrifuge process; centrifuges requiring more tightly bound flocs. Flocculant and electrolyte use was only about ⅓ of that used as compared to similar centrifuge-based operations drilled in the same locale and to the same depth range.

Figure 12:
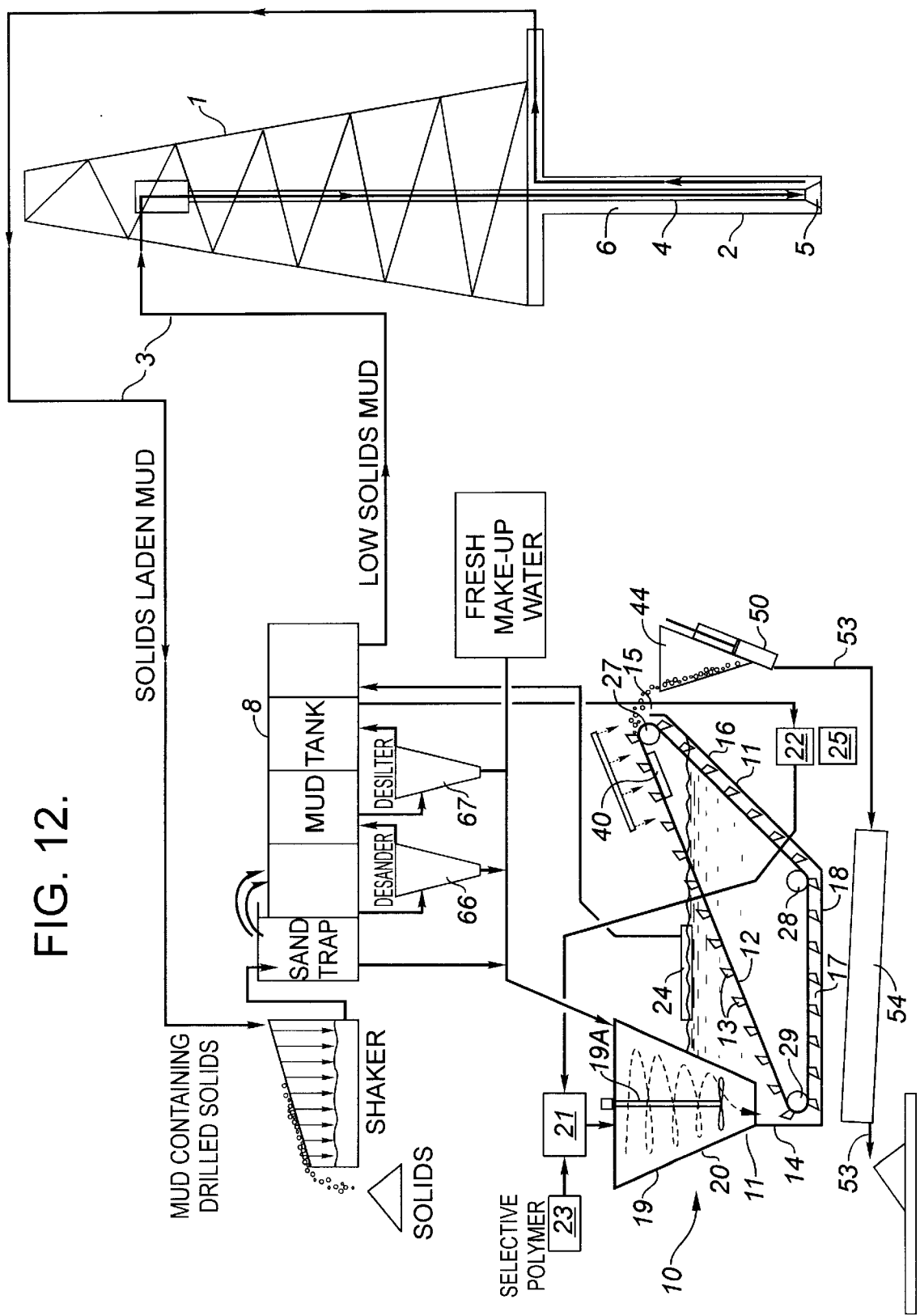
FIG. 12 is a schematic view of an embodiment of the present invention as applied to selectively flocculate drilling fluids.

In a second embodiment, shown in FIG. 12, selective flocculation may be successfully practised, wherein flocculant may be added to the mixing tank 21 for the flocculation of undesirable ultrafine drilled solids, but preferentially does not flocculate bentonitic solids. Stirrer 19a is slowly rotated and floc forms in the relatively quiescent conditions in the cone-tank 19. The variable speed conveyor 12 is slowed to minimize disturbance in the tank 11. The light floc is gently collected by a combination of dredging and the filtering by the screened buckets 13. Vibration of the dewatering table 40 is minimized to avoid degradation of the floc back into water and ultrafines. Air blasts are minimized and sizes of the screens 34 are adjusted for optimal filtering of the light floc. Clarified bentonitic mud overflows weir 24 and is recycled back to the active system.

In another embodiment, again illustrated in FIG. 12, the performance of the process is improved by recognizing that solids which have been concentrated, such as by hydroclones, are favourably predisposed to settling. There is little advantage in flocculating such concentrated solids. Accordingly, while a stream of mud is directed to the mixing tank 21 and mixed with a selective flocculant, a second solids-concentrated underflow stream from hydroclones 66, 67 is advantageously directed to the tank's bottom 18 where it is dredged immediately by the screened buckets 13. While one may provide a separate conduit to the tank's bottom 18, it is preferable to merely divert the hydroclone stream, which may discharge into the mixing tank, instead to enter the cone tank 19 at its periphery. The centrifugal action in the cone tank 19 aids in maintaining segregation of coarse solids, which remain against the tank's wall, and the lighter ultrafine solids and flocs, which tend to remain in middle of the tank. Therefore, by short-circuiting coarse solids directly to the tank's bottom for recovery by dredging, flocculant is not consumed unnecessarily.

To summarize briefly, the present invention provides an environment in which those solids which settle can be recovered by dredging and those solids which do not settle can be recovered by filtering. The filtering can be affected by the speed and size of the screens. The cut point can be manipulated. Factors which affect the cut point for solids which settle, and those which do not, include: the concentration and nature of the solids; the rate at which solids-laden liquid is processed in the apparatus; the density of the solids-containing liquid and the liquid in the apparatus; and whether flocculation is practised.

In yet another embodiment, it can be seen that the apparatus can be conveniently adapted to operate in several stages, operating first as a washer and screening unit and subsequently and periodically, applying the method of the invention to successfully deal with the collected ultrafines. More particularly, a stream of clarified water from the settling tank is recycled to the first end of the apparatus for coming-ling and washing a stream of coarse solids (like sand or gravel) which are contaminated by the presence, or a coating, of ultrafine solids. Ultrafine-free solids (washed or clean solids) are conveyed out of the apparatus in coarse-screened buckets while the ultrafines collect and become suspended in the tank water. Then, as described previously, once the quantity of ultrafines reaches a certain level, then flocculant may be added for practising the method of the invention whereby floc is formed, floc is collected in the buckets and is dewatered for collection. This two-stage embodiment permits the cleaned solids to be collected separately from the periodic ultrafine floc product.

Clearly, the invention is not restricted to the aforementioned embodiments. Reasonable variations and modifications will be apparent to one skilled in the art and can be made without departing from the spirit and scope expressed. For example, the separation of settled and suspended solids is clearly a problem which appears in other industries such as sewage treatment digester solids. Mineral processing industries like mining, gravel washing, and soil remediation and pulp and paper industries face restricted water use and problems with ultrafines buildup.

Application of the process and apparatus of the invention to ultrafine solids other than drilling muds is illustrated in Example III. Reference is again made to FIG. 11, as treating sewage from sumps instead of mud.

EXAMPLE III

At sewage settling ponds for the City of Calgary, Alberta, Canada, the apparatus of the invention processed the effluent from the city's sewage treatment plant digesters. The digester liquid sewage effluent was first piped to settling ponds. The sewage was allowed to settle in a progressive series of eight lagoons or sumps (containing 2.5 million barrels of fluids). Conventionally, the solids content of the final lagoon concentrated to about 9–12% and was pumped off by vacuum truck for distribution on farmer's fields.

The top three feet of slurry in the lagoons is the slowest settling and contained about 1–2% of ultrafine organic solids which have a low specific gravity. The slurry was processed by the invention.

About 40–60 gpm of slurry was successfully processed using the apparatus and practising enhanced polymer flocculation. Clear water was produced and directed back to the lagoon. Dewatered flocs were dumped into a dry sump storage. The settling tank liquid was maintained at 600–1000 mg/l soluble calcium (using commercial grade calcium sulphate) and a cationic flocculant (trade names Percol 787 and Percol 757) available from Allied Colloids (Canada) Inc., Calgary, Alberta.

Returning to application to drilling muds, as described in the background, conventional well drilling operation, like sewage treatment or pulp and paper applications, is characterised by various stages having differing solids-separation demands. An advantage of the present invention is a flexibility of operation which enables adaptation to such variations.

More particularly, for the preferred embodiment of separating solids from drilling fluids, the typical stages of drilling a well include: drilling of surface hole, first with mud and then drilling the next section with clear water for fast penetration; mudding-up to facilitate deeper drilling; and then finally, clean up of the final inventory of mud remaining in the rig's tanks. For effective separation of solids, each stage requires differing emphasis Initially, the entire flow of whole mud can be directed to the mixing tank 21. The screened buckets filter the tank's contents and dredge settled solids. Until the ultrafines become a problem, flocculation is not practised. As the solids concentration climbs, a slipstream of mud from the rig can be routed through hydroclones, the concentrated underflow being directed to discharge adjacent the tank's bottom, preferably down the wall of the cone tank. As the solids concentration climbs yet further, enhanced polymer flocculation is practised, aiding in the settling and filtered capture of the ultrafines.

After placing surface casing, it is conventional to proceed with water drilling and not add mud until difficulties are encountered in conveying the solids to the surface. Without mud, the liquid viscosity is typically lower and high throughput rates may be achieved. Flocculation is practised at the commencement of water drilling to forestall build up of the ultrafines concentration.

Once the drilling deepens, the character of the drilling fluid is deliberately altered including increased viscosity using bentonite and/or polymers to better convey solids to the surface. This is colloquially referred to as "mud up". This stage of drilling is characterised by increased ultrafine loading and also being the stage of operation which is the most challenging for centrifuges. While processing desander and desilter underflow, the apparatus can be run in three progressively more aggressive process stages: first running the cone tank stirrer at higher speed and using 40–60 mesh bucket screens for filtering ultrafines; second, diluting the incoming mud with clarified water to promote improved settling; and finally, when the mud density can no longer be controlled, initiate enhanced polymer flocculation, preferably by starting with a settling tank of fresh water.

At the completion of drilling, the active mud tank system is usually filled with solids-laden mud. Similarly, should a drilling operation have resulted in the creation of a sump, as described above, the contents must be separated into its clear water and solids constituents for economic disposal. The entire contents of the mud system of sump can be processed, removing solids from the liquid and returning clarified water to the rig tanks or sump. Eventually the sump contains clarified water for disposal and dewatered solids are stockpiled. Environmental approvals are readily obtained for disposal of the large volume of substantially clear water, occasional adjustment of the pH being required.

In yet another embodiment, for the treatment of weighted muds, such as those using barite, it is desirable to first recover barite solids and secondly to reject ultrafines. More particularly, this may be accomplished by reducing the liquid's viscosity to about 35–40 sec/quart to settle the barite solids and dredging them using the screened buckets, recycling them to the active system. Once barite is recovered, the undesirable low and high gravity ultrafines are treated by flocculation for filtering of the resulting floc, rejection of the undesirable solids and recycling of clarified water to the active system.

In yet another embodiment, though the above is described with respect to water-based muds, the filtering and collection of settled solids from invert muds is performed in an equivalent manner, including adding diesel as required for volume building and additionally obtaining the benefits of improved settling as the fresh diesel flows through the apparatus. Note that a flocculation step is not practised with hydrocarbon-based muds.

The embodiments of the invention in which an exclusive property or privilege is claimed are defined as follows:

1. A process of separating solids from liquid, the process comprising:

providing a settling tank having sides, a bottom and first and second ends, flowing liquid containing suspended solids into the tank's first end;

maintaining a liquid level in the tank;

separating at least a portion of the suspended solids by gravity which settle onto the tank's bottom;

continuously advancing a plurality of spaced-apart screens along an endless path which includes at least descending into the liquid from a first point above the liquid at the tank's second end to a second point on the tank's bottom, then advancing laterally to a third point on the bottom unique from the second point and adjacent the first end of the tank, and then, ascending to exit the liquid and return to the first point wherein solids are collected on the screens for clarifying the liquid, firstly by dredging solids which have settled by gravity as the screens are advanced along the bottom of the tank between the second and third points, and secondly by filtering progressively finer solids from the suspended solids through the formation of a filter cake of solids on the screens;

substantially dewatering the collected solids by firstly vibrating the solids-containing screens which lay along the ascending portion of the path and are above the liquid level and secondly by directing blasts of air onto the collected solids contained in the screens;

advancing the screens to a fourth point external to the tank;

recovering dewatered collected solids external to the tank by firstly inverting the screens at the fourth point and secondly by directing air onto the back of the inverted screens; and withdrawing clarified liquid from the second end of the tank at a point adjacent the surface of the liquid.

2. The process as set forth in claim 1 wherein the liquid flowing into the first end of the settling tank discharges adjacent the tank's bottom.

3. The process as set forth in claim 2 further comprising:

manipulating the viscosity of the liquid in the tank by mixing substantially solids-free liquid with the liquid flowing into the tank so as to alter the fraction of suspended solids which settle and those which remain in suspension.

4. The process as set forth in claim 3 further comprising:

changing the screen passing size so as to alter the fraction of suspended solids which are filtered by the screens versus those dredged from the tank's bottom.

5. The process as set forth in claim 4 further comprising:
flowing the liquid containing suspended solids into a cone-shaped vessel having downwardly converging walls and a lower discharge, said vessel being positioned at the first end of the tank and having its discharge located below the liquid level, adjacent and above the path where the screens begin to ascend, so that liquid flowing into the tank impinges on the ascending screens.

6. The process as set forth in claim 5 further comprising:
spinning the liquid within the cone-shaped vessel so that solids in the liquid are urged outwardly against the downwardly converging walls wherein the solids are concentrated against said walls prior to discharging said concentrated solids downwardly onto the ascending screens.

7. The process as set forth in claim 6 further comprising:
spraying the screens with a substantially solids-free liquid prior to their descending into the tank's liquid so as to thoroughly wash them of residual solids, washing liquid and residual solids into the tank.

8. The process as set forth in claim 7 wherein a portion of the solids-free screen washing liquid comprises clarified liquid recycled from the second end of the tank.

9. The process as set forth in claim 8 wherein vibration of the solids-containing screens for dewatering the collected solids is achieved by supporting the screens upon and advancing the screens over a vibrating table.

10. The process as set forth in claim 9 wherein the screens are vibrated at a frequency of about 30 Hz.

11. The process as set forth in claim 9 wherein the liquid flowing into the tank is mixed with a flocculant for the aggregation of at least a portion of the suspended solids into floc, the floc being collected firstly by dredging gravity-settled floc from the tank's bottom and secondly by filtering suspended floc with the screens, the collected floc being recovered external to the tank.

12. The process as set forth in claim 11 wherein the screens containing the collected solids, in the form of floc, are vibrated at a frequency which is insufficient to breakdown the floc to release solids from the floc.

13. The process as set forth in claim 1 wherein at least a portion of the liquid containing suspended solids is directed into the tank's first end and a solids-concentrated slip-stream of the liquid is discharged adjacent the tank's bottom for dredging by the screens.

14. The process as set forth in claim 1 wherein the liquid flowing into the tank is mixed with a flocculant for the aggregation of at least a portion of the suspended solids into floc, the floc and solids being collected firstly by dredging gravity-settled floc and solids from the tank's bottom and secondly by filtering suspended floc and solids with the screens, the collected floc being recovered external to the tank.

15. The process as set forth in claim 14 wherein the liquid flowing into the tank is a solids-concentrated underflow from hydroclones.

16. The process as set forth in claim 15 wherein the liquid flowing into the tank originates from the mud sump of an oil well drilling rig.

17. The process as set forth in claim 16 wherein the liquid flowing into the tank originates directly from the active mud system of an oil well drilling rig.

18. The process as set forth in claim 1 wherein the solids contained in the liquid flowing into the tank comprise high-density and low density solids, the high-density solids having both a coarse and a fine fraction, the coarse high-density solids being separately recovered by:

reducing the viscosity of the liquid in the tank so that coarse high-density solids preferentially gravity-settle;

collecting the coarse high-density solids substantially by dredging gravity-settled solids from the tank's bottom, dewatering and advancing them external to the tank;

recovering dewatered collected coarse high-density solids external to the tank and withdrawing a clarified liquid which, over time, contains an increasing quantity of residual solids comprising fine high-density solids and low-density solids; and when the quantity of residual solids is too great, flocculating the residual solids remaining in the liquid in the tank to aggregate at least a portion residual solids form floc, collecting the floc and residual solids being collected firstly by dredging gravity-settled floc and residual solids from the tank's bottom and secondly by filtering suspended floc and residual solids with the screens, recovering a clarified liquid and recovering collected floc and residual solids external to the tank, said collected floc and residual solids being recovered separately from the coarse high-density solids recovered previously.

19. The process as set forth in claim 18 wherein the viscosity of the liquid flowing into the tank is manipulated by commingling with substantially solids-free liquid.

20. A process of treating used mud from an oil well drilling rig for clarification of drilled solids from the mud, said used mud having been prepared in a mud tank and delivered downhole to aid in the drilling process, the used mud returning as liquid containing solids including coarse cuttings and fine solids, the process comprising:

separating coarse cuttings from the used mud by screening to produce a cuttings-free mud;

separating fine solids from the cuttings-free mud using hydroclones to produce a clarified mud and a hydroclone underflow liquid containing fine solids;

recycling the clarified mud to the mud tank for re-use and reconstitution of more mud;

flowing hydroclone liquid underflow containing fine solids into a settling tank, said tank having a bottom and first and second ends and being initially charged with clear water, said hydroclone underflow flowing into said first end;

maintaining a liquid level in the tank by the addition of solids-free liquid as necessary;

separating at least a portion of the fine solids in the tank's liquid by gravity;

collecting fine solids by advancing a plurality of spaced-apart screens along an endless path which includes at least descending into the tank's liquid from a first point above the liquid at the tank's second end to a second point on the tank's bottom, then advancing laterally to a third point on the bottom unique from the second point and adjacent the first end of the tank and then ascending to exit the tank's liquid and return to the first point wherein solids are collected on the screens to clarify the tank's liquid, firstly by dredging fine solids which have settled by gravity as the screens are advanced along the bottom of the tank between the second and third points, and secondly by filtering progressively finer solids from the suspended solids through the formation of a filter cake of fine solids on the screens;

substantially dewatering the collected fine solids by firstly vibrating the solids-containing screens which lay along the ascending portion of the path and are above the liquid level and secondly by directing blasts of air onto the collected fine solids contained in the screens;

advancing the screens to a fourth point external to the tank;

recovering dewatered collected fine solids external to the tank by firstly inverting the screens at the fourth point and secondly by directing air onto the back of the inverted screens;

withdrawing clarified liquid from the second end of the tank at a point adjacent the surface of the liquid; and recycling the clarified liquid to the mud tank for preparation of more mud.

21. A process as set forth in claim 20 comprising:

mixing a flocculant with the liquid for the aggregation of at least a portion of the fine solids to form floc, said floc and fine solids being processed collectively as solids.

22. A process as set forth in claim 21 comprising:

mixing a selective flocculant with the hydroclone underflow liquid for aggregation of only that portion of the fine solids which are drilled solids to form floc so as to avoid substantial aggregation of fine solids which are beneficial constituents of the mud.

23. A process as set forth in claim 21 wherein the selective flocculant aggregates drilled solids to form floc without substantial aggregation of bentonitic solids.

24. Apparatus for separating solids from liquid including a settling tank, said tank having side walls, a bottom, and first second ends, comprising;

means for feeding liquid into the first end of the tank;

means for maintaining a liquid level in the tank;

a plurality of discrete means spaced on an endless loop of conveyor for screening the tank's contents;

means for advancing said conveyor and screening means through the tank;

means for guiding said conveyor along a path which includes at least descending into the liquid from a first point above the liquid at the tank's second end to a second point on the tank's bottom for traversing the liquid and collecting solids suspended therein, then advancing laterally to a third point on the bottom unique from the second point and adjacent the first end of the tank for collecting settled solids and then ascending to exit the liquid and return to the first point for again traversing the liquid and collecting solids suspended therein;

means for vibrating those screening means which lay along the ascending portion of the path and which are above the liquid level for dewatering of collected solids;

means for directing stream of air onto the contents of the screening means for further dewatering the collected solids;

means associated with the first path point for inverting the screening means to dump the dewatered solids external to the tank;

means for directing air onto the back of the screening means for cleaning residual solids therefrom and dumping them external to the tank; and means for withdrawing a clarified liquid from the second end of the tank.

25. Separation apparatus as cited in claim 24 wherein the tank's side walls slope inwardly towards the bottom, funnelling solids which settle towards the path of the screening means as they advance along the tank's bottom.

26. Separation apparatus as cited in claim 25 wherein the endless conveyor comprises link chain, the advancing means comprising a drive sprocket and the guide means comprising the drive sprocket and at least two idler sprockets.

27. Separation apparatus as cited in claim 26 wherein the sprocket at the first point of the path is positioned such that when the buckets round the head sprocket, the screening means project outwards and become inverted for dumping collected solids outside the extents of the second end of the tank.

28. Separation apparatus as cited in claim 27 wherein the screening means comprise a bucket having walls forming a concave pocket which has an opening facing the direction of advance and the bucket walls are formed of screen material, said buckets extending radially outwards from the loop of conveyor so as to depend downwardly from the conveyor while descending and advancing along the tank bottom, and to stand radially upwardly from the conveyor when ascending.

29. Separation apparatus as cited in claim 28 wherein each bucket defines a right prism volume, having a rectangular backing wall, a leading rectangular opening and substantially trapezoidal side walls, each wall formed of replaceable screening material.

30. Separation apparatus as cited in claim 29 wherein the clarified liquid removal means comprises a weir over which clarified water flows.

31. Separation apparatus as cited in claim 30 further comprising means for collecting the dumped solids; and means for advancing the dumped solids to a discharge location remote from the settling tank.

32. Separation apparatus as cited in claim 31 wherein the dumped solids advancing means comprises means for cyclically subjected the solids to compression and decompression, so that during compression, additional water is separated from the solids to collect along the interface of the solids and pumping means, and during decompression, the liquid drains free of the solids whereby the solids are further dewatered before discharge at the remote location.

33. A process of separating solids from liquid, the process comprising:

providing a settling tank having sides, a bottom and first and second ends;

maintaining a liquid level in the tank;

withdrawing clarified liquid from the second end of the tank at a point adjacent the surface of the liquid;

recycling clarified liquid to the tank's first end;

feeding coarse solids contaminated with ultrafine solids to the tank's first end;

washing ultrafine solids from the coarse solids by mixing them with the recycled liquid and forming a suspension of ultrafines in the recycled liquid;

flowing the liquid containing washed coarse solids and ultrafine suspension into the tank's first end;

separating the coarse solids by gravity so that the coarse solids settle onto the tank's bottom;

continuously advancing a plurality of spaced-apart screens along an endless path which includes at least descending into the liquid from a first point above the liquid at the tank's second end to a second point on the tank's bottom, then advancing laterally to a third point on the bottom unique from the second point and adjacent the first end of the tank, and then, ascending to exit the liquid and return to the first point, the screens having coarse screen openings for passing substantially all solids but the coarse solids, wherein coarse solids are collected on the screens for clarifying the liquid by dredging solids which have settled by gravity and which constitute the largest portion of the coarse solids as the screens are advanced along the bottom of the tank between the second and third points;

advancing the screens to a point external to the tank and dumping collected solids by inverting the screens for recovery of collected, substantially ultrafine-free solids external to the tank;

repeatedly feeding, washing and collecting coarse solids until the concentration of ultrafine solids in the liquid in the tank is such that the coarse solids are which are collected are no longer substantially free of ultrafine solids; then discontinuing the feeding of solids to the tank;

mixing a flocculant with the recycled liquid for the aggregation of at least a portion of the ultrafine solids into floc having sufficient bulk to facilitate their collection on the screens;

flowing the liquid containing floc and ultrafine solids into the tank's first end and separating at least a portion of the floc and ultrafine solids by gravity which settle onto the tank's bottom;

collecting floc and ultrafine solids by continuously advancing the plurality of spaced-apart screens along the endless path wherein floc and ultrafine solids are collected by the screens;

dewatering the collected floc and ultrafine solids by vibrating the solids-containing screens which lay along the ascending portion of the path and are above the liquid level and further by directing blasts of air onto the screen contents; and advancing the screens to a point external to the tank and dumping the dewatered collected floc and ultrafine solids by inverting the buckets external to the tank and cleaning residual floc and residual ultrafine solids from the screens by directing air onto the back of the screens for recovering the dewatered floc and ultrafine solids external to the tank.

* * * * *